(12) United States Patent
Yuasa et al.

(10) Patent No.: US 11,541,925 B2
(45) Date of Patent: Jan. 3, 2023

(54) WORKING MACHINE

(71) Applicant: KUBOTA CORPORATION, Osaka (JP)

(72) Inventors: Junichi Yuasa, Sakai (JP); Tsuyoshi Gono, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 116 days.

(21) Appl. No.: 17/115,842

(22) Filed: Dec. 9, 2020

(65) Prior Publication Data
US 2021/0189688 A1 Jun. 24, 2021

(30) Foreign Application Priority Data

Dec. 19, 2019 (JP) .............................. JP2019-229262

(51) Int. Cl.
| | |
|---|---|
| *B62D 1/04* | (2006.01) |
| *B60K 20/02* | (2006.01) |
| *B60K 26/02* | (2006.01) |
| *G05G 1/02* | (2006.01) |
| *B62D 49/02* | (2006.01) |
| *B62D 49/06* | (2006.01) |

(52) U.S. Cl.
CPC .............. *B62D 1/043* (2013.01); *B60K 20/02* (2013.01); *B60K 26/02* (2013.01); *B62D 1/046* (2013.01); *B60K 2026/028* (2013.01); *B62D 49/02* (2013.01); *B62D 49/0692* (2013.01); *G05G 1/02* (2013.01)

(58) Field of Classification Search
CPC ........ B62D 1/043; B62D 1/046; B62D 49/02; B62D 49/0692; B60K 20/02; B60K 26/02; B60K 2026/028; E02F 9/2004; G05G 1/02
See application file for complete search history.

(56) References Cited

U.S. PATENT DOCUMENTS

| | | | | |
|---|---|---|---|---|
| 1,572,995 | A * | 2/1926 | Gates ........................ | F16B 2/08 403/233 |
| 3,776,318 | A * | 12/1973 | Layton .................. | E02F 3/7604 172/507 |
| 7,204,338 | B2 * | 4/2007 | Katae ..................... | B62D 1/043 180/315 |

(Continued)

FOREIGN PATENT DOCUMENTS

| | | | |
|---|---|---|---|
| CN | 107839746 A | * | 3/2018 |
| DE | 10 2004 040 975 A1 | | 3/2006 |

(Continued)

OTHER PUBLICATIONS

Machine translation of DE 102004040975 A1 obtained on Jun. 13, 2022.*

(Continued)

*Primary Examiner* — Adam D Rogers
(74) *Attorney, Agent, or Firm* — Keating and Bennett, LLP

(57) ABSTRACT

A working machine includes a machine body capable of traveling, a working device to be attached to the machine body, a steering handle provided to the machine body and capable of being rotatably operated, an assist grip attached to the steering handle to assist a rotating operation of the steering handle, and an operation tool provided to the assist grip to operate devices provided to the machine body.

12 Claims, 16 Drawing Sheets

(56) References Cited

U.S. PATENT DOCUMENTS

| | | | | |
|---|---|---|---|---|
| 7,451,587 | B2* | 11/2008 | Komiya | A01D 34/64 |
| | | | | 56/14.9 |
| 7,591,626 | B2* | 9/2009 | Curtis | B60P 1/6463 |
| | | | | 414/442 |
| 7,621,365 | B2* | 11/2009 | Egan | B62D 1/046 |
| | | | | 280/771 |
| 8,853,916 | B2* | 10/2014 | Browne | G05G 1/02 |
| | | | | 310/332 |
| 9,056,625 | B2* | 6/2015 | Tashiro | B66F 9/24 |
| 2005/0217920 | A1 | 10/2005 | Egan | |
| 2006/0191733 | A1* | 8/2006 | Paquin | G05G 1/08 |
| | | | | 74/553 |
| 2009/0091469 | A1* | 4/2009 | Kempf | B62D 1/043 |
| | | | | 340/4.1 |
| 2016/0167719 | A1 | 6/2016 | Higashiguchi et al. | |
| 2020/0001710 | A1 | 1/2020 | Taira et al. | |

FOREIGN PATENT DOCUMENTS

| | | | | | |
|---|---|---|---|---|---|
| DE | 10 2006 056 514 | A1 | | 6/2008 | |
| DE | 102011013321 | A1 | * | 9/2012 | B60R 16/027 |
| DE | 102012107334 | A1 | * | 2/2014 | B62D 1/043 |
| EP | 1 533 208 | A2 | | 5/2005 | |
| GB | 2440732 | A | * | 2/2008 | B60N 2/143 |
| JP | 10-45014 | A | | 2/1998 | |
| JP | 2011-243445 | A | | 12/2011 | |
| JP | 2015-035149 | A | | 2/2015 | |
| JP | 2018-071676 | A | | 5/2018 | |
| JP | 2019-059388 | A | | 4/2019 | |
| KR | 970004328 | Y1 | * | 5/1997 | |
| KR | 102236676 | B1 | * | 4/2021 | |
| WO | 99/14095 | A1 | | 3/1999 | |
| WO | 2009/050744 | A1 | | 4/2009 | |
| WO | WO-2009050744 | A1 | * | 4/2009 | B62D 1/043 |
| WO | WO-2009150671 | A | * | 12/2009 | B62D 1/043 |

OTHER PUBLICATIONS

Official Communication issued in corresponding European Patent Application No. 20212709.8, dated May 12, 2021.

Official Communication issued in corresponding Japanese Patent Application No. 2019-229262, dated Nov. 1, 2022.

* cited by examiner

FIG.3
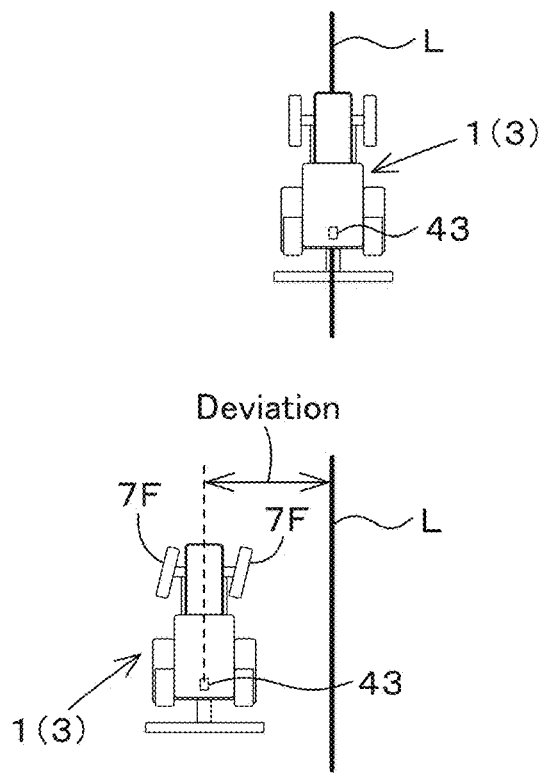
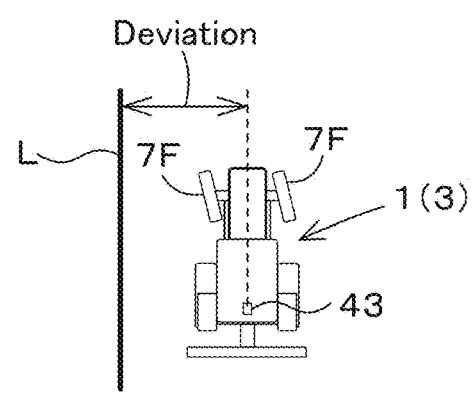
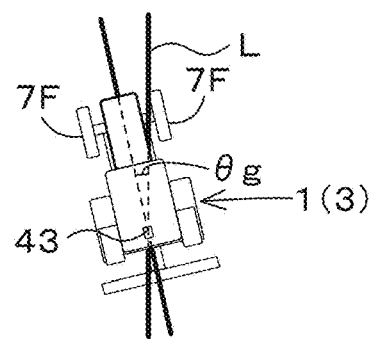

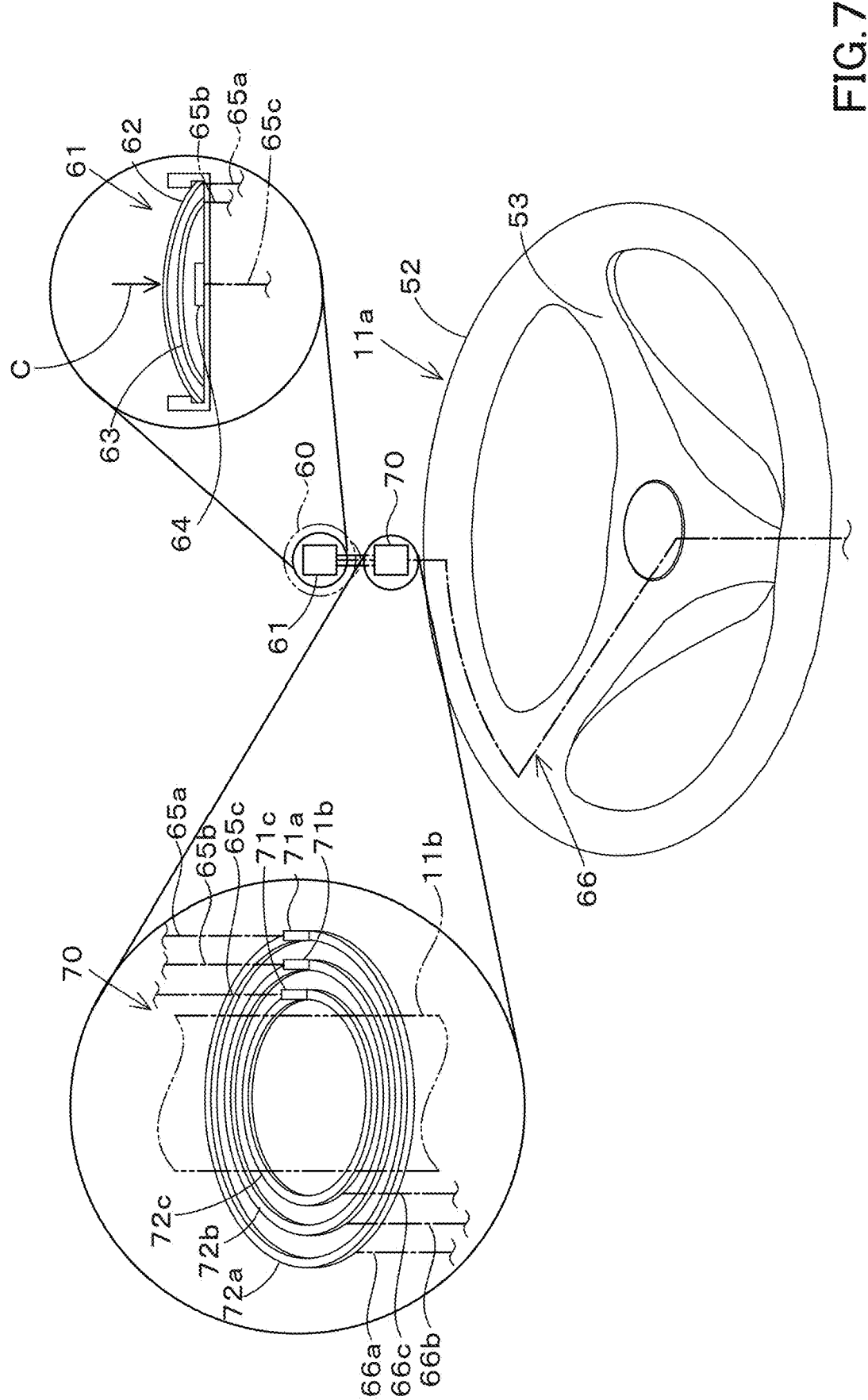

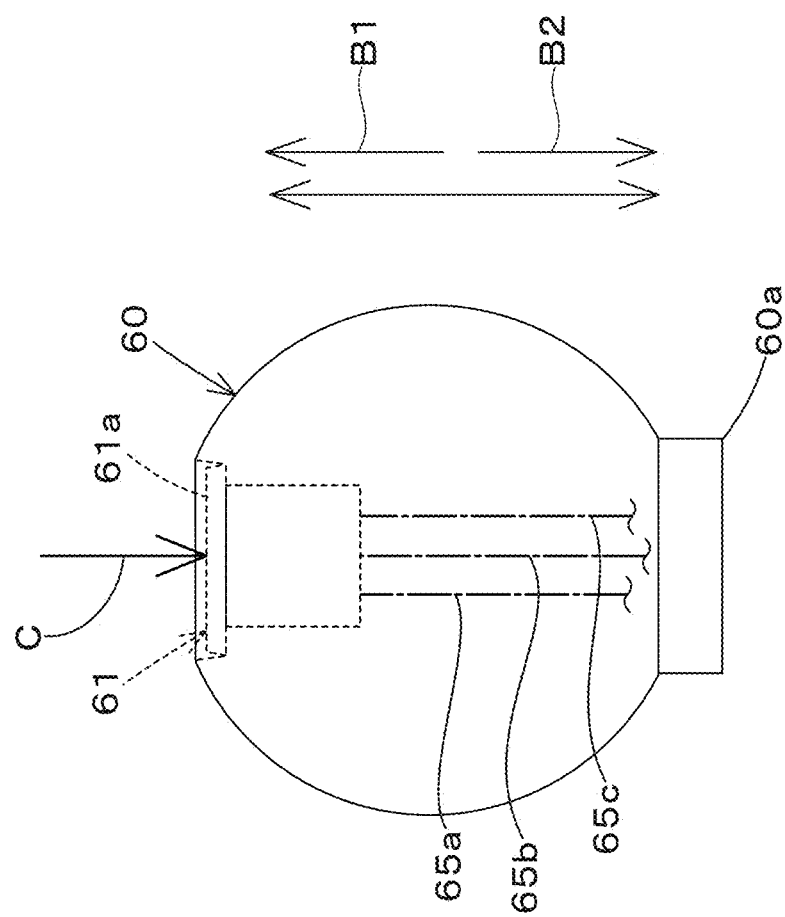

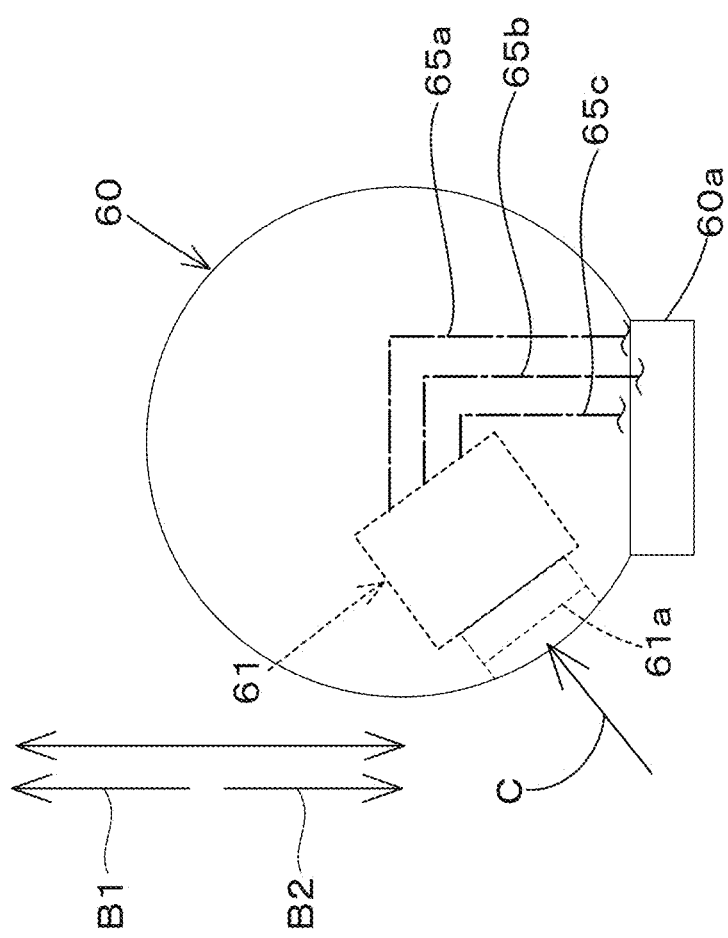

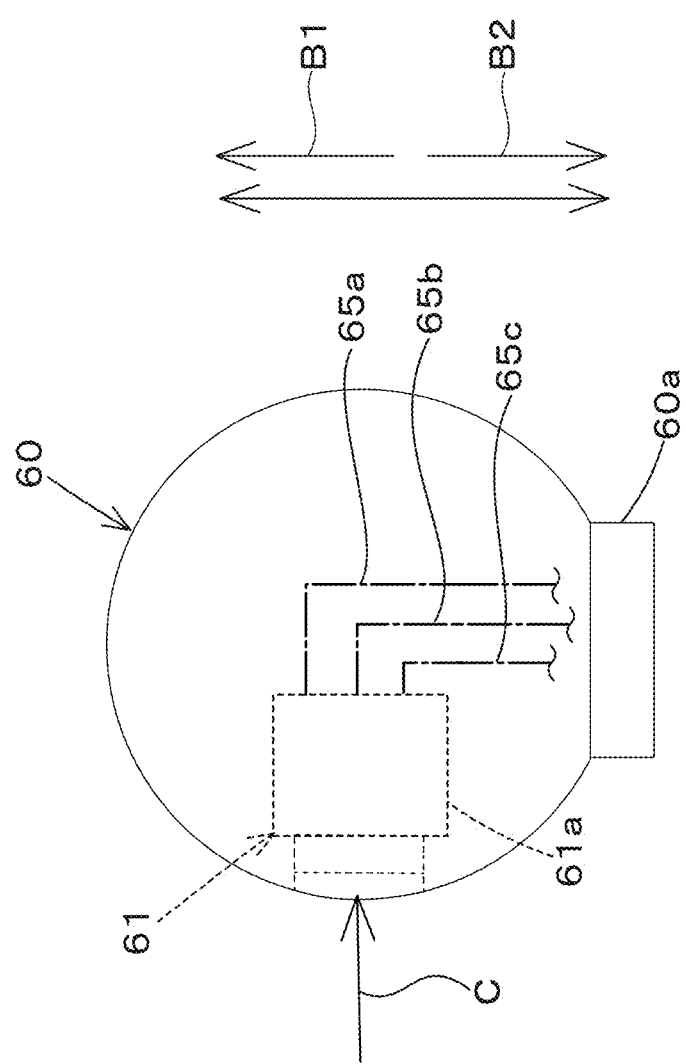

WORKING MACHINE

CROSS REFERENCE TO RELATED APPLICATIONS

This application claims the benefit of priority to Japanese Patent Application No. 2019-229262 filed on Dec. 19, 2019. The entire contents of this application are hereby incorporated herein by reference.

BACKGROUND OF THE INVENTION

1. Field of the Invention

The present invention relates to a working machine such as a tractor including a steering handle.

2. Description of the Related Art

The working machine disclosed in Japanese Unexamined Patent Publication No. 2019-59388 includes a movable body, a rotatable steering handle provided on the movable body, and a lever (shuttle lever) configured to be operated to switch a transmission device between forward traveling and backward traveling.

SUMMARY OF THE INVENTION

A working machine according to one aspect of a preferred embodiment of the present invention, includes a machine body capable of traveling, a working device to be attached to the machine body, a steering handle provided to the machine body and capable of being rotatably operated, an assist grip attached to the steering handle to assist a rotating operation of the steering handle, and an operation tool provided to the assist grip to operate devices provided to the machine body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 is a view explaining automatic steering.

FIG. 4 is a perspective view illustrating periphery of a steering handle, a shuttle lever and the like.

FIG. 5 is a plan view illustrating periphery of a steering handle, a shuttle lever and the like.

FIG. 6 is a back view illustrating periphery of a steering handle, a shuttle lever and the like.

FIG. 7 is a view explaining an operation tool, first to sixth cables, a connector structure and the like.

FIG. 8B is a side view illustrating an assist grip and an operation tool.

FIG. 9B is a side view illustrating an assist grip and an operation tool according to a first modified example of a preferred embodiment of the present invention.

FIG. 10B is a side view illustrating an assist grip and an operation tool according to a second modified example of a preferred embodiment of the present invention.

DETAILED DESCRIPTION OF THE PREFERRED EMBODIMENTS

Figure 1:
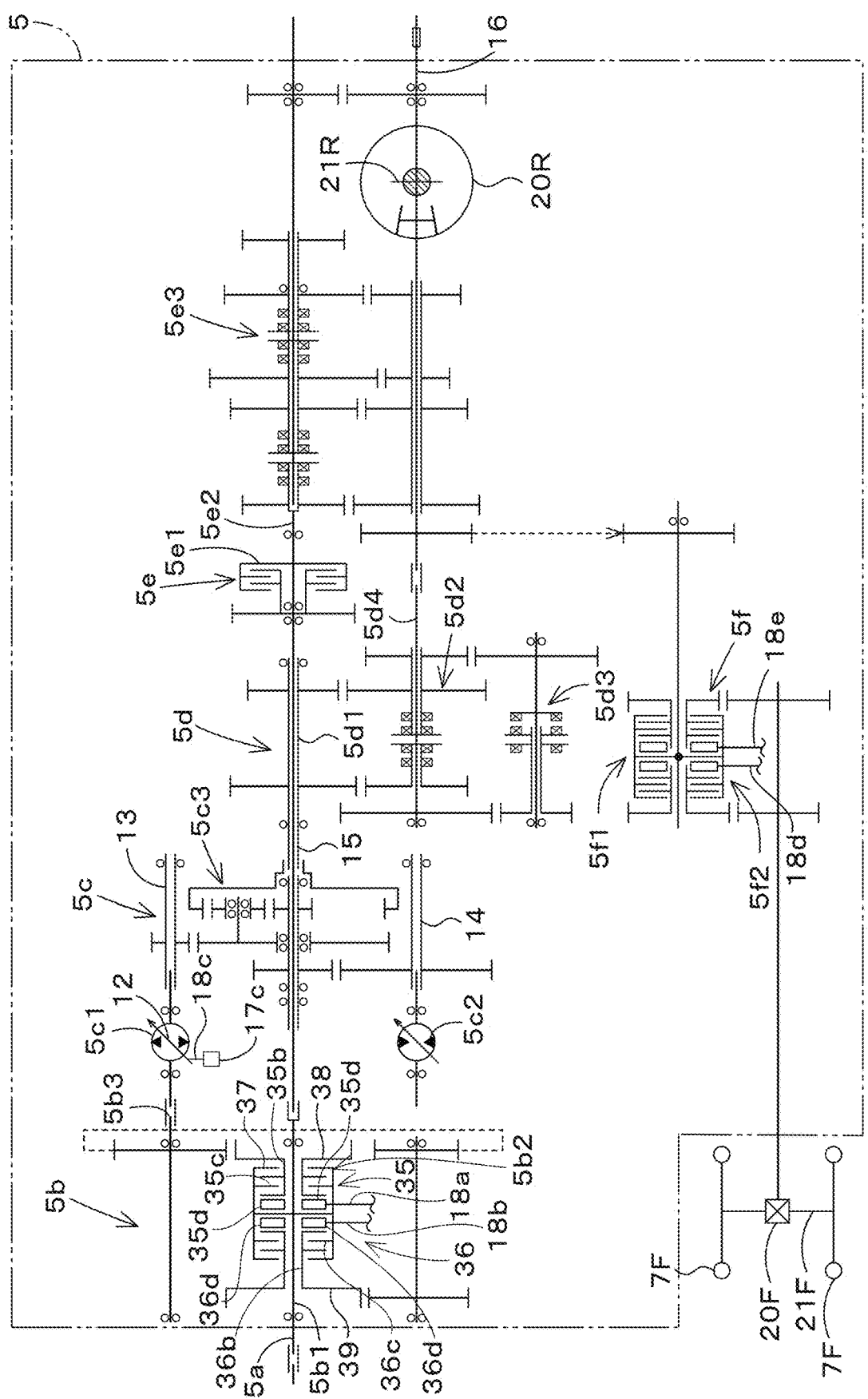
FIG. 1 is a configuration view of a speed-shifter device.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 12:
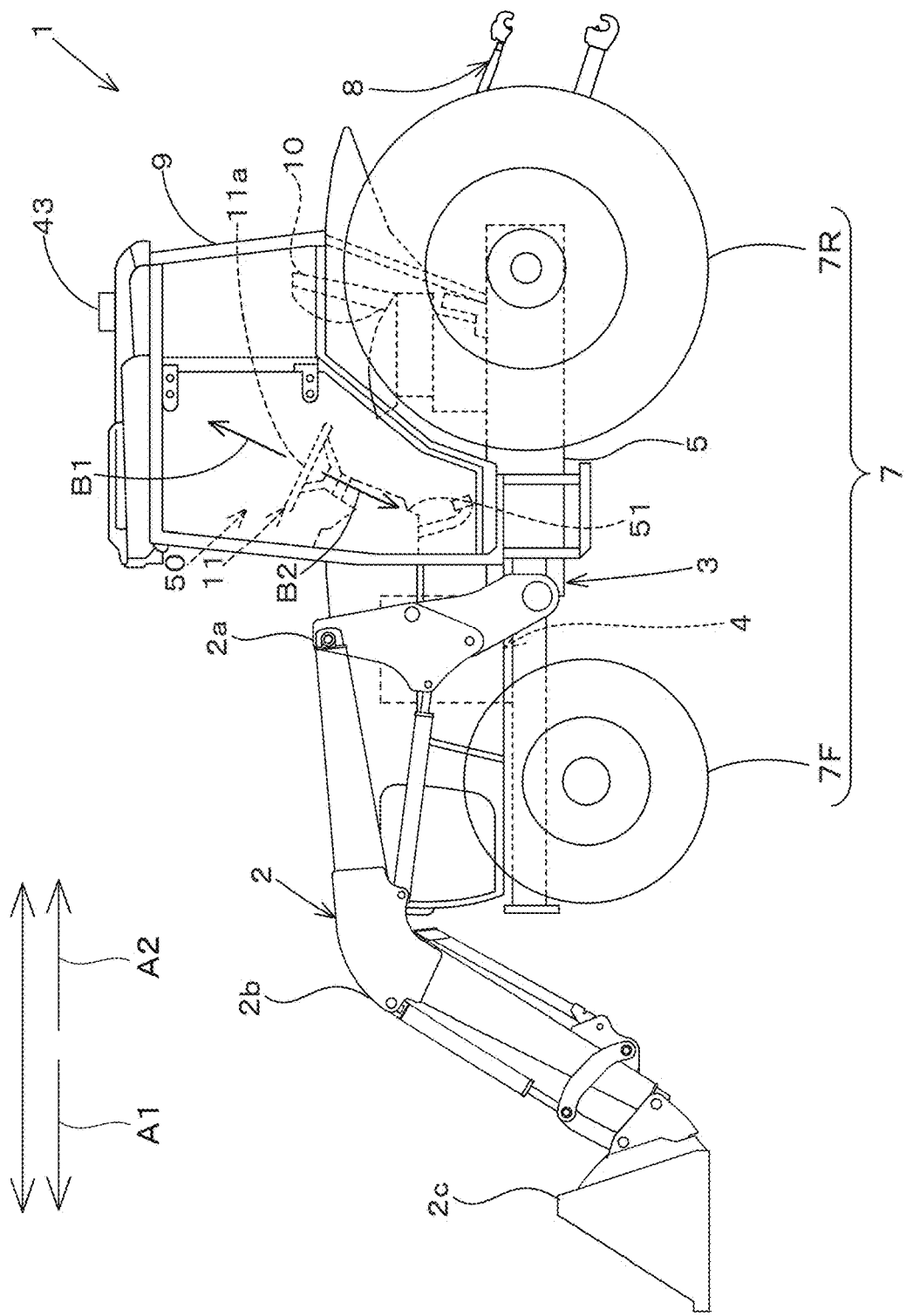
FIG. 12 is a side whole view of a working machine to which a front loader serving as a working device is connected.

FIG. 12 shows a tractor, which is an example of a working machine 1. In this preferred embodiment, a tractor will be used as an example of the working machine 1. However, the working machine 1 is not limited to a tractor, but is an agricultural machine such as a rice transplanter for agricultural work, and a construction machine such as a backhoe for construction work.

In a preferred embodiment of the present invention, the front side of an operator (a driver) seating on an operator seat 10 of the working machine 1 is described as the front (a direction of an arrowed line A1 in FIG. 12 and the like), the rear side of the operator (a direction of an arrowed line A2 in FIG. 12 and the like) is described as the rear, the left side of the operator is described as the left, and the right side of the operator is described as the right.

As shown in FIG. 12, the working machine 1 is provided with a traveling vehicle (machine body) 3 which includes a traveling device 7 and is capable of traveling, a prime mover 4, a speed shifter device (transmission) 5, and a steering mechanism 11. The traveling device 7 includes a front wheel 7F and a rear wheel 7R. The front wheel 7F may be a tire-type or crawler-type.

The rear wheel 7R may also be a tire-type or crawler-type. The prime mover 4 is a gasoline engine, an internal combustion engine such as a diesel engine, and an electric motor. In this preferred embodiment, the prime mover 4 is a diesel engine.

The speed shifter device 5 is capable of switching the propulsion of the traveling device 7 by shifting gears, and of switching the traveling device 7 between the forward traveling and the backward traveling. A cabin 9 is provided in the machine body 3, and an operator seat 10 is provided in the cabin 9.

As shown in FIG. 12, a lifter device 8 is provided at the rear portion of the machine body 3. The working machine (not shown in the drawings) can be attached to and detached from the lifter device 8. The lifter device 8 is capable of raising and lowering the attached working device.

The working device includes a cultivator device for tilling, a fertilizer sprayer device for spraying fertilizer, a pesticide sprayer device for spraying pesticides, a harvester device for harvesting, a mower device for harvesting grass and the like, a tedder device for diffusing grass and the like, a raking device for collecting grass and the like, and a baler device for molding grass and the like. In addition, a working device can be attached to the front portion of the machine body 3 separately from the rear portion of the machine body 3.

In this preferred embodiment, a front loader 2 is attached to the front portion of the machine body 3. The front loader 2 includes an attachment frame 2a attached to the front portion of the machine body 3, a boom 2b pivotally provided on the attachment frame 2a, and a working tool (for example, a bucket) 2c supported on the boom 2b. The front loader 2 can raise and lower the work tool by pivoting the boom 2b in a vertical direction.

As shown in FIG. 1, the speed-shifter device 5 includes a main shaft (propulsion shaft) 5a, a shuttle portion 5b, a main speed-shifter portion 5c, a sub speed-shifter portion 5d, a PTO power transmission portion 5e, and a front transmission portion 5f. The propulsion shaft 5a is rotatably supported in the housing case of the speed-shifter device 5, and power from the crankshaft of the prime mover 4 is transmitted to the propulsion shaft 5a.

As shown in FIG. 1, the shuttle portion 5b includes a shuttle shaft 5b1 and a forward/backward switching portion 5b2. The power from the propulsion shaft 5a is transmitted to the shuttle shaft 5b1. The forward/backward switching portion 5b2 includes, for example, a hydraulic clutch or the like, and switches the direction of rotation of the shuttle shaft 5b1, that is, the forward movement and backward movement of the working machine 1, by turning the hydraulic clutch on and off.

In particular, the forward/backward switching portion 5b2 includes a forward clutch portion 35 and a backward clutch portion 36. The forward clutch portion 35 and the backward clutch portion 36 include a housing 37 that rotates integrally with the propulsion shaft 5a.

As shown in FIG. 1, the forward clutch portion 35 includes a cylindrical shaft 35b, a friction plate 35c disposed between the housing 37 and the cylindrical shaft 35b, and a pressing member 35d. The pressing member 35d is held in a direction away from the pressing member 35d and away from the friction plate 35c by a biasing member such as a spring, which is not shown in the drawings.

As shown in FIG. 1, in the housing 37 on the side of the forward clutch portion 35, a first fluid line 18a is connected to supply and discharge the hydraulic fluid.

Figure 2:
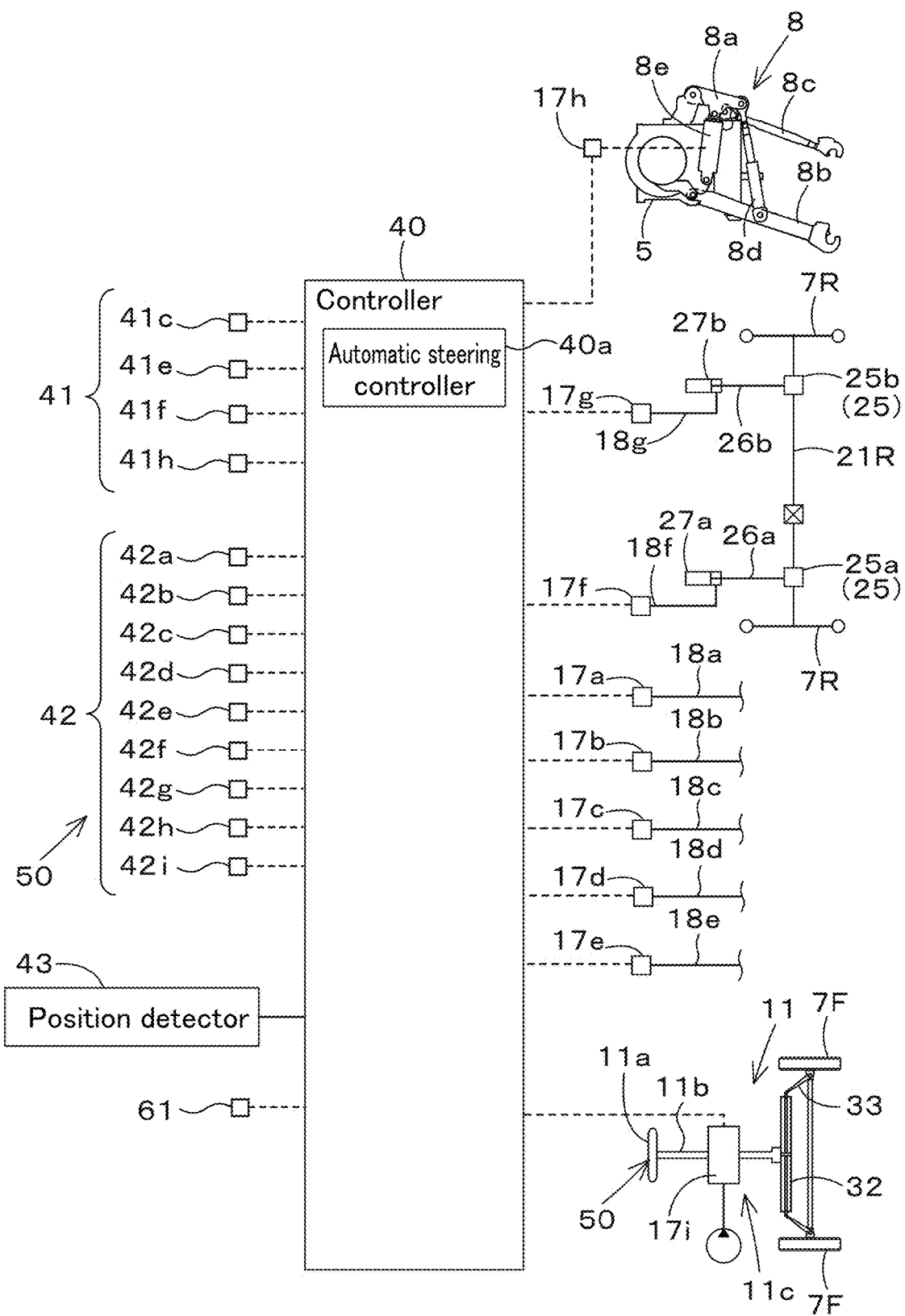
FIG. 2 is a view illustrating a control block of a working machine.

As shown in FIG. 2, the first fluid line 18a is connected to the first control valve 17a. And, when hydraulic fluid is supplied from the first control valve 17a to the housing 37 side by changing the opening of the first control valve 17a, the pressing member 35d moves to the pressure side (connection side) against the force of the spring, causing the friction plate 35c pressed toward the housing 37 side. In this manner, the forward clutch portion 35 is engaged by pressure on the housing 37 side, and then the power of the propulsion shaft 5a is transmitted to the gear 38, which rotates integrally with the cylindrical shaft 35b.

On the other hand, when the hydraulic fluid is discharged from the housing 37 side into the first fluid line 18a, the pressing member 35d moves to the disengagement side by the force of the spring, causing the friction plate 35c to move away from the housing 37 side, and the forward clutch portion 35 becomes disengaged.

The power of the propulsion shaft 5a is not transmitted to the gear 38. The output side gear (output gear) 38 of the forward clutch portion 35 engages the output shaft 5b3, and when the forward clutch portion 35 is engaged, the driving power is transmitted to the output shaft 5b3.

As shown in FIG. 1, the backward clutch portion 36 includes a cylindrical shaft 36b, a friction plate 36c between the housing 37 and the cylindrical shaft 36b, and a pressing member 36d. The pressing member 36d is held in a direction away from the pressing member 36d and away from the friction plate 36c by a biasing member, such as a spring, which is not shown.

As shown in FIG. 1, in the housing 37 on the rearward clutch portion 36 side, a second fluid line 18b is connected to supply and drain the hydraulic fluid.

As shown in FIG. 2, the second fluid line 18b is connected to the second control valve 17b, and when hydraulic fluid is supplied from the second control valve 17b to the housing 37 side by changing the opening of the second control valve 17b, the pressing member 36d moves to the pressure side (connection side) against the force of the spring. In this manner, the friction plate 36c is forced to the housing 37 side, then the backward clutch portion 36 is engaged. The power of the propulsion shaft 5a is transmitted to the gear 39, which rotates integrally with the cylindrical shaft 36b.

On the other hand, when the hydraulic fluid is discharged from the housing 37 side into the second fluid line 18b, the pressing member 36d moves to the disengagement side by the force of the spring, causing the friction plate 36c to move away from the housing 37 side, and the backward clutch portion 36 becomes disengaged.

The power of the propulsion shaft 5a is not transmitted to the gear 39. The gear 39 on the output side of the backward clutch portion 36 (output gear) engages the output shaft 5b3, and when the backward clutch portion 36 is engaged, the drive power is transmitted to the output shaft 5b3.

The main speed-shifter portion 5c is a stepless transmission mechanism that changes the input power to stepless. As shown in FIG. 1, the stepless transmission mechanism includes a hydraulic pump 5c1, a hydraulic motor 5c2, and a planetary gear mechanism 5c3.

The hydraulic pump 5c1 is driven by power from the output shaft 5b3 of the shuttle portion 5b. The hydraulic pump 5c1 is, for example, a variable displacement pump including a swash plate 12, and by changing the angle of the swash plate 12 (swash plate angle), the flow rate of hydraulic fluid output from the hydraulic pump 5c1 can be changed.

The hydraulic motor 5c2 is a motor that is driven by the hydraulic fluid output from the hydraulic pump 5c1 through a pipe or other fluid line. The revolving speed of the hydraulic motor 5c2 can be changed by changing the swash plate angle of the hydraulic pump 5c1 or by changing the power input to the hydraulic pump 5c1.

As shown in FIG. 1, the planetary gear mechanism 5c3 is a mechanism including a plurality of gears (various types of gears) and a power transmission shaft such as an input shaft and an output shaft, and includes an input shaft 13, in which the power of the hydraulic pump 5c1 is input, an input shaft 14, in which the power of the hydraulic motor 5c2 is input, and an output shaft 15, in which the power is output. The planetary gear mechanism 5c3 combines the power of the hydraulic pump 5c1 with the power of the hydraulic motor 5c2 and transmits the combined power to the output shaft 15.

Thus, according to the main speed-shifter portion 5c, the power output to the sub speed-shifter portion 5d can be changed by changing the swash plate angle of the swash plate 12 of the hydraulic pump 5c1, the speed of the prime mover 4, and the like.

In this preferred embodiment, the swash plate 12 can be changed in angle by the hydraulic fluid supplied from the third control valve 17c. The swash plate 12 and the third control valve 17c are connected, for example, by a third fluid line 18c, which feeds and drains the hydraulic fluid.

The third control valve 17c is a two-position switching valve with a solenoid valve, and by magnetizing or demagnetizing the solenoid of the solenoid valve, the hydraulic fluid flowing through the third fluid line 18c can be adjusted and the angle of the swash plate 12 can be adjusted, that is, the power output to the sub speed-shifter portion 5d can be changed. Although the main speed-shifter portion 5c is configured with a stepless transmission mechanism, it may also be a stepless transmission mechanism in which gears are used to change the speed.

The sub speed-shifter portion 5d is a transmission mechanism including a plurality of stepped gears (various types of gears) for changing the power, and by changing the connection (engagement) of the plurality of gears accordingly, the power input to the sub speed-shifter portion 5d from the output shaft 15 of the planetary gear mechanism 5c3 is changed and output (shifting).

As shown in FIG. 1, the sub speed-shifter portion 5d includes an input shaft 5d1, a first-speed clutch 5d2, a second-speed clutch 5d3, and an output shaft 5d4. The input shaft 5d1 is a shaft to which the power of the output shaft 15 of the planetary gear mechanism 5c3 is input, and the input power is input to the first gear shift clutch 5d2 and the second gear shift clutch 5d3 through gears and the like.

By switching the engagement and disengagement of the first gear shift clutch 5d2 and the second gear shift clutch 5d3, the input power is changed and output to the output shaft 5d4. The power output to the output shaft 5d4 is transmitted to the rear wheel differential device 20R. The rear wheel differential device 20R rotatably supports the rear axle 21R on which the rear wheel 7R is mounted.

As shown in FIG. 1, the PTO power transmission portion 5e includes a PTO clutch 5e1, a PTO propulsion shaft 5e2, and a PTO transmission portion 5e3. The PTO clutch 5e1 includes, for example, a hydraulic clutch, and the like, and is switched between a state in which the power of the propulsion shaft 5a is transmitted to the PTO propulsion shaft 5e2 and a state in which the power of the propulsion shaft 5a is not transmitted to the PTO propulsion shaft 5e2 by turning the hydraulic clutch on and off.

The PTO transmission portion 5e3 includes a gearshift clutch and a plurality of gears, and the like, to change the power (speed) input from the PTO propulsion shaft 5e2 to the PTO transmission portion 5e3 to output the power (speed). The power of the PTO transmission portion 5e3 is transmitted to the PTO shaft 16 through the gears and the like.

As shown in FIG. 1, the front transmission portion 5f includes a first front speed-shifting clutch 5f1 and a second front speed-shifting clutch 5f2. The first and second front speed-shifting clutches 5f1 and 5f2 are capable of transmitting power from the sub speed-shifter portion 5d, that is, the power of the output shaft 5d4 is transmitted through the gears and the transmission shaft.

The power from the first and second front speed-shifting clutches 5f1 and 5f2 can be transmitted to the front axle 21F via the front transmission shaft 22. In particular, the front transmission shaft 22 is connected to the front wheel differential device 20F, and the front wheel differential device 20F rotatably supports the front axle 21F on which the front wheels 7F are mounted.

As shown in FIG. 1, the first front speed-shifting clutch 5f1 and the second front speed-shifting clutch 5f2 are configured with a hydraulic clutch or the like. A fourth fluid line 18d is connected to the first front speed-shifting clutch 5f1, and as shown in FIG. 2, the fluid line is connected to a fourth control valve 17d to which hydraulic fluid output from the hydraulic pump is supplied. The first front speed-shifter clutch 5f1 is switched between an engaged and a disengaged state depending on the degree of opening of the fourth control valve 17d.

As shown in FIG. 1, a fifth fluid line 18e is connected to the second front speed-shifter clutch 5f2, and as shown in FIG. 2, the fifth fluid line 18e is connected to a fifth control valve 17e. The second front speed-shifter clutch 5f2 is switched between a connected and a disconnected state depending on the degree of opening of the fifth control valve 17e.

The fourth control valve 17d and the fifth control valve 17e are, for example, two-position switching valves with solenoid valves, which are switched to a connected or disconnected state by magnetization or demagnetization of the solenoid of the solenoid valve.

When the first front speed-shifting clutch 5f1 is disengaged and the second front speed-shifting clutch 5f2 is engaged, the power of the auxiliary transmission portion 5d is transmitted to the front wheels 7F through the second front speed-shifting clutch 5f2. This results in four-wheel drive (4WD) in which the front wheels 7F and the rear wheels 7R are driven by the power and the rotational speeds of the front wheels 7F and the rear wheels 7R are approximately the same (4WD constant speed state).

On the other hand, when the first front speed-shifter clutch 5f1 is engaged and the second front speed-shifter clutch 5f2 is disengaged, four-wheel drive is provided and the rotational speed of the front wheels 7F is higher than that of the rear wheels 7R (4WD increased speed state).

When the first and second front speed-shifting clutches 5f1 and 5f2 are engaged, the power of the auxiliary transmission portion 5d is not transmitted to the front wheels 7F, so that the rear wheels 7R become two-wheel drive (2WD) driven by the power.

As shown in FIG. 2, the working machine 1 is provided with a brake device 25. The brake device 25 includes a left brake device 25a and a right brake device 25b. The left brake device 25a and the right brake device 25b are disk-type brake devices 25, which can be switched between a braking state for braking and a braking release state for releasing the braking. The left brake device 25a is provided on the left side of the rear axle 21R, and the right brake device 25b is provided on the right side of the rear axle 21R.

For example, a left brake pedal (not shown in the drawings) and a right brake pedal (not shown in the drawings) are provided near the operator seat 10. When an operator operating the working machine 1 operates (depresses) the left brake pedal, the left connector member 26a connected to the left brake pedal moves in the braking direction, and the left brake device 25a can be put into the braking state. By the operator operating (depressing) the right brake pedal, the right connector member 26b connected to the right brake pedal can move in the braking direction to put the right brake device 25b in the braking state.

The left hydraulic actuator 27a, which is operated by the hydraulic fluid, is connected to the left connector member 26a. A sixth control valve 17f is connected to the left hydraulic actuator 27a via the sixth fluid line 18f. The sixth control valve 17f allows the left hydraulic actuator 27a to move the left connected member 26a in the braking direction by activating the left hydraulic actuator 27a.

The right hydraulic actuator 27b, which is operated by the hydraulic fluid, is connected to the right connector member 26b. A seventh control valve 17g is connected to the right hydraulic actuator 27b via the seventh fluid line 18g. The seventh control valve 17g allows the right hydraulic actuator 27b to move the right connected member 26b in the braking direction by activating the right hydraulic actuator 27b.

As described above, the left brake device 25a and the right brake device 25b can bring the left rear wheel 7R and the right rear wheel 7R into a braking state independently not only by the operation of the left brake pedal and the right brake pedal, but also by the operation of the left hydraulic actuator portion 27a and the right hydraulic actuator portion 27b.

In this preferred embodiment, the left brake device 25a is provided on the left side of the rear axle 21R, and the right brake device 25b is provided on the right side of the rear axle 21R, and the brake device 25 performs braking of the rear wheel 7R among the wheels 7F and 7R, but the brake device 25 may be provided on the left side and right side of the front axle 21F instead of or in addition to the left brake device 25a and the right brake device 25b to perform braking of the front wheel 7F.

As shown in FIG. 2, the lifter device 8 includes a lift arm 8a, a lower link 8b, a top link 8c, a lift rod 8d, and a lift cylinder 8e. The front end portion of the lift arm 8a is pivotally supported upwardly or downwardly in the upper rear portion of the case (transmission case) housing the speed-shifter device 5. The lift arm 8a is pivoted (raised or lowered) by the drive of the lift cylinder 8e.

The lift cylinder 8e includes a hydraulic cylinder. The lift cylinder 8e is connected to a hydraulic pump via an eighth control valve 17h. The eighth control valve 17h is a solenoid valve or the like, which stretches and shortens the lift cylinder 8e.

As shown in FIG. 2, the front end portion of the lower link 8b is pivotally supported upwardly or downwardly at the rear bottom portion of the speed-shifter device 5. The front end portion of the top link 8c is pivotally supported upwardly or downwardly on the rear portion of the speed-shifter device 5 above the lower link 8b. A lift rod 8d connects the lift arm 8a to the lower link 8b.

The working machine is connected to the rear portion of the lower link 8b and the rear portion of the top link 8c. When the lift cylinder 8e is driven (telescoping), the lift arm 8a is raised and lowered, and the lower link 8b connected to the lift arm 8a via the lift rod 8d is raised and lowered. This causes the working machine to pivot upward or downward (raise or lower) with the front portion of the lower link 8b as the fulcrum.

As shown in FIG. 2, the steering mechanism 11 includes a steering handle (steering wheel) 11a, a rotation shaft (steering axis) 11b that rotates with the rotation of the steering handle 11a, and an auxiliary mechanism (power steering mechanism) 11c that assists the steering of the steering handle 11a.

The steering handle 11a operates the steering of the machine body 3 and is manually operated by the driver. The assist mechanism 11c includes a ninth control valve 17i and a steering cylinder 32.

The ninth control valve 17i is a three-position switching valve that can be switched, for example, by movement of a spool or the like. The ninth control valve 17i can also be switched by steering the rotation shaft 11b. The steering cylinder is connected to an arm (knuckle arm) 33 that changes the direction of the front wheel 7F.

Thus, by operating the steering wheel 11a, the switching position and opening of the ninth control valve 17i is switched according to the steering wheel 11a, and the steering cylinder 32 stretches and shortens to the left or right according to the switching position and opening of the ninth control valve 17i, the steering direction of the front wheels 7F can be changed. The steering mechanism 11 described above is an example and is not limited to the configuration described above.

As shown in FIG. 2, the working machine 1 is provided with a controller 40. The controller 40 is performs various controls of the working machine 1. A plurality of detectors 41 are connected to the controller 40. The plurality of detectors 41 detect the state of the working machine 1, including a motor rotation sensor (rotation sensor) 41c, which detects the number of revolutions of the prime mover 4, a steering angle sensor 41e, which detects the steering angle of the steering mechanism 11, an angle sensor 41f, which detects the angle of the lift arm 8a, a speed sensor 41h, which detects the vehicle speed (speed) of the machine body 3, and the like.

The speed sensor 41h detects vehicle speed by converting, for example, the number of revolutions of the front axle 21F, the number of revolutions of the rear axle 21R, the number of revolutions of the front wheels 7F, the number of revolutions of the rear wheels 7R, and the like into vehicle speed.

The speed sensor 41h can also detect the direction of rotation of the front axle 21F, the rear axle 21R, the front wheels 7F and the rear wheels 7R, and can also detect whether the working machine 1 (machine body 3) is moving forward or backward. The detector 41 described above is an example and is not limited to the sensors described above.

A plurality of operation members 42 are also connected to the controller 40. The plurality of operation members 42 include a forward/backward switch lever (shuttle lever) 42a to switch the movement of the machine body 3 between forward or backward, an ignition switch 42b to start the prime mover 4, and the like, a PTO speed-shifter lever 42c to set the number of revolutions of the PTO shaft 16, a gearshift change switch to switch either automatic or manual gearshift 42d, a gearshift lever 42e to manually change the gear shift (gear shift level) of the speed-shifter device 5, a gas pedal 42f to increase or decrease the vehicle speed, a one-touch switch 42g to operate the lifter device 8, an upper limit setter dial 42h to set the upper limit of the lifter device 8, a vehicle speed lever 42i to set the vehicle speed, and the like. The operation members 42 described above are an example and are not limited to the operation members 42 described above.

When the shuttle lever 42a is operated in the forward direction, the controller 40 moves the machine body 3 forward by switching the forward/backward switching portion 5b2 of the shuttle portion 5b to forward. When the shuttle lever 42a is operated to backward, the controller 40 switches the forward-backward switch 5b2 of the shuttle portion 5b to backward, thus moving the machine body 3 backward.

The controller 40 starts the prime mover 4 after the prescribed process when the ignition switch 42b is operated to ON, and stops driving the prime mover 4 when the ignition switch 42b is operated to OFF.

The controller 40 changes the number of revolutions of the PTO shaft 16 (referred to as the PTO speed) by switching the PTO transmission gear built into the speed-shifter device 5 when the PTO speed-shifter lever 42c is operated.

When the speed-shifting switch 42d is switched to automatic transmission, the controller 40 automatically switches one of the main speed-shifter portion 5c and the sub speed-shifter portion 5d according to the state of the working machine 1, and automatically changes the speed shifter device 5's gear shift (shifting level) to a predetermined gear shift (shifting level).

The controller 40 automatically switches one of the main speed-shifter portion 5c and the auxiliary transmission portion 5d according to the gear shift level (shifting level) set by the transmission lever 42e, when the speed-shifting switch 42d is switched to the manual transmission, to change the gear shift level of the speed-shifter device 5.

When the gas pedal 42f is operated, the controller 40 changes the speed (velocity) of the machine body 3 by changing the number of revolutions of the prime mover 4 (referred to as the prime mover speed) according to the amount of operation of the accelerator 42f.

The controller 40 extends the lift cylinder 8e by controlling the eighth control valve 17h and raises the rear end portion of the lift arm 8a (the end portion of the work unit side) by controlling the eighth control valve 17h when the one-touch switch 42g is operated in the direction of raising it (the up side). The controller 40 shortens the lift cylinder 8e by controlling the eighth control valve 17h and lowers the rear end portion of the lift arm 8a (end portion of the working device side) by controlling the eighth control valve 17h when the pump switch 42g is operated in the direction of lowering (downward side).

The controller 40 stops the lifting operation in the lifter device 8 when the position of the working device, that is, the angle of the lift arm 8a, reaches the upper limit (upper height limit) set by the upper limit setter dial 42h, when the working device is lifted by the lifter device 8.

The working machine 1 may be provided with a position detector 43 to detect the position of the machine body 3 and an automatic steering controller 40a to control the automatic steering of the machine body 3 based on the position.

In such a case, the position detector 43 can detect the position (positioning information including latitude and longitude) of itself (machine body 3) via a satellite positioning system (positioning satellites) such as D-GPS, GPS, GLO-NASS, HOKUTO, GALILEO, and MICHIBIKI.

That is, the position detector 43 receives satellite signals transmitted from the positioning satellite (such as the position of the positioning satellite, transmission time, correction information, and the like) and detects the position (that is, latitude and longitude) of the working machine 1 based on the satellite signals.

In this preferred embodiment, for example, the position detector 43 is installed in the upper portion (roof) of the cabin 9 covering the operator seat 10 of the working machine 1. The position detector 43 need only be able to detect the position of the working machine 1, and the attachment position and configuration are not limited to the above configuration.

As shown in FIG. 2, the controller 40 includes an automatic steering controller 40a. The automatic steering controller 40a includes an electrical and electronic circuit in the controller 40, a program stored in a CPU, and the like. The automatic steering controller 40a controls the assist mechanism 11c so that the machine body 3 travels along the scheduled traveling route L based on the control signals output from the controller 40.

As shown in FIG. 3, when the deviation between the position of the machine body 3 and the scheduled traveling route L is less than predetermined, the automatic steering controller 40a controls the assist mechanism 11c to maintain the rotation angle of the rotation shaft 11b. When the deviation between the position of the machine body 3 and the scheduled traveling route L is greater than predetermined and the working machine 1 is located on the left side with respect to the scheduled traveling route L, the automatic steering controller 40a controls the assist mechanism 11c so that the steering direction of the working machine 1 is in the right direction and rotates the rotation shaft 11b.

When the deviation between the position of the machine body 3 and the scheduled traveling route L is greater than or equal to a predetermined value and the working machine 1 is located on the right side with respect to the scheduled traveling route L, the automatic steering controller 40a controls the assist mechanism 11c to rotate the rotation shaft 11b such that the steering direction of the working machine 1 is in the left direction.

In the preferred embodiment described above, the steering angle of the steering mechanism 11 was changed based on the deviation between the position of the machine body 3 and the scheduled traveling route L. However, when the orientation of the scheduled traveling route L differs from the orientation of the direction (traveling direction) of the working machine 1 (machine body 3) (the orientation of the machine body 3), that is, the orientation of the machine body 3 with respect to the scheduled traveling route L. When the angle $\theta g$ is greater than or equal to a predetermined angle $\theta g$, the automatic steering controller 40a may set the steering angle so that the angle $\theta g$ is zero (the orientation of the machine body 3 coincides with the orientation of the scheduled traveling route L to be traveled).

The automatic steering controller 40a may also set the final steering angle in automatic steering based on the steering angle obtained based on the deviation (position deviation) and the steering angle obtained based on the orientation (orientation deviation).

The setting of the steering angle in automatic steering in the above-described preferred embodiment is an example and not limited. Instead of or in addition to the automatic steering controller 40a, the working machine 1 may include an automatic traveling controller portion such that the machine body 3 travels along the scheduled traveling route L and controls the speed of the machine body 3 based on the scheduled traveling route L.

The following is a detailed description of the operation device 50, including the steering wheel 11a and a plurality of operation members 42. In the following description of the steering wheel 11a, and the like, the operator's side seating on the operator seat 10 will be described as the front side B1 (arrowed lines in FIG. 4, FIG. 6, FIG. 12, and the like), and the opposite side of the front side B1, that is, the opposite side of the operator's side seating on the operator seat 10, will be described as the back side B2 (arrowed lines in FIG. 4, FIG. 6, and the like, FIG. 12).

Figure 4:
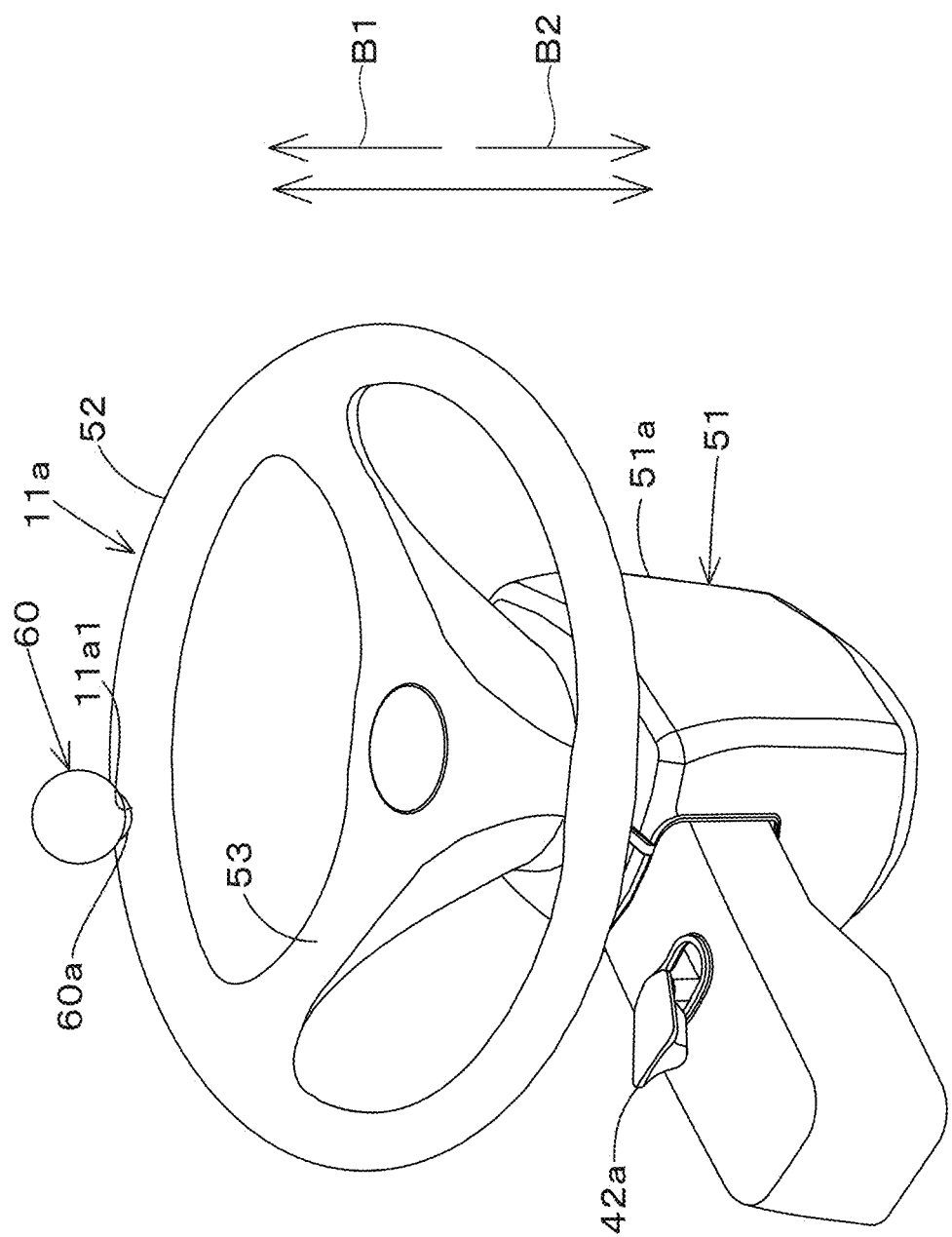
Figure 5:
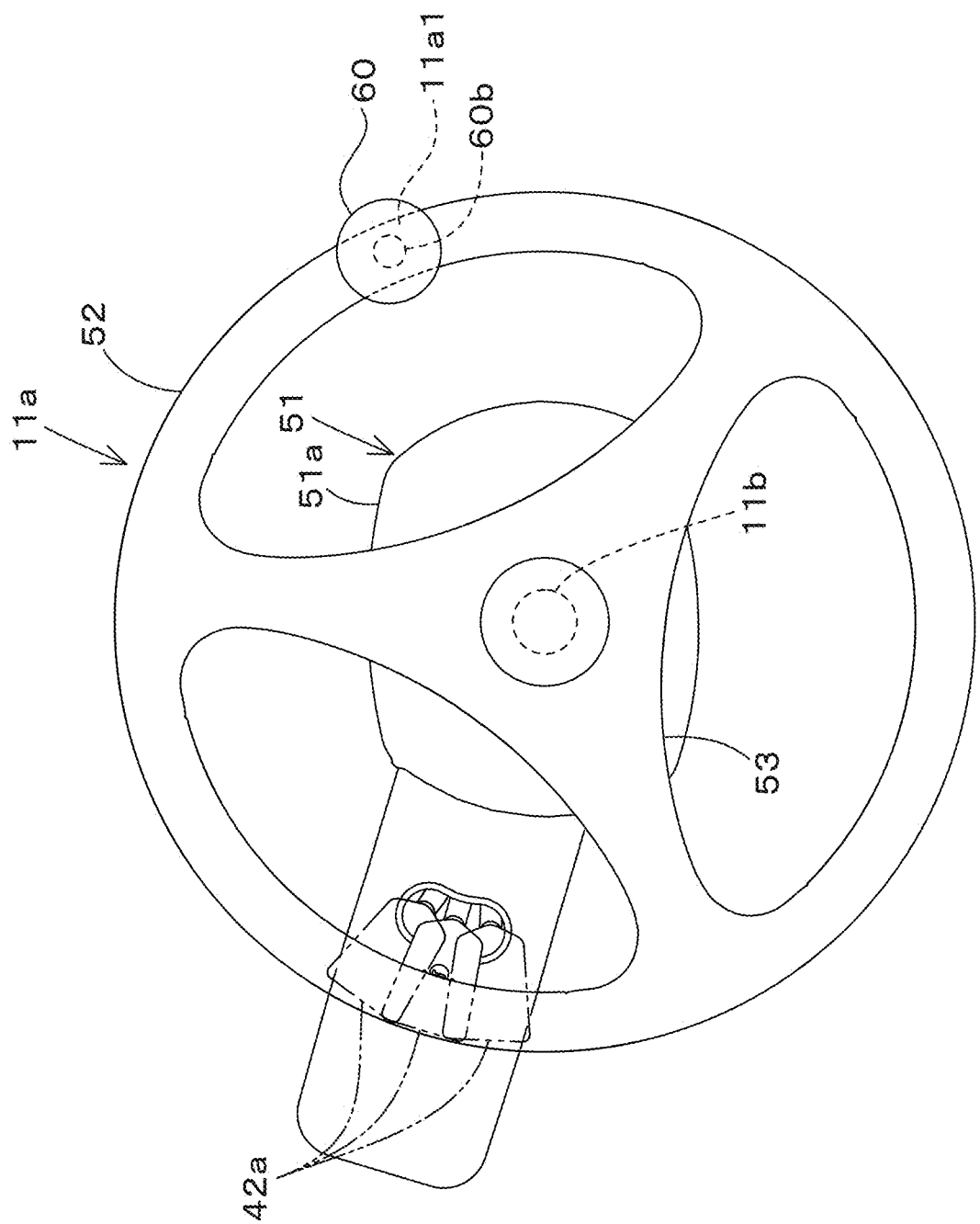
Figure 6:
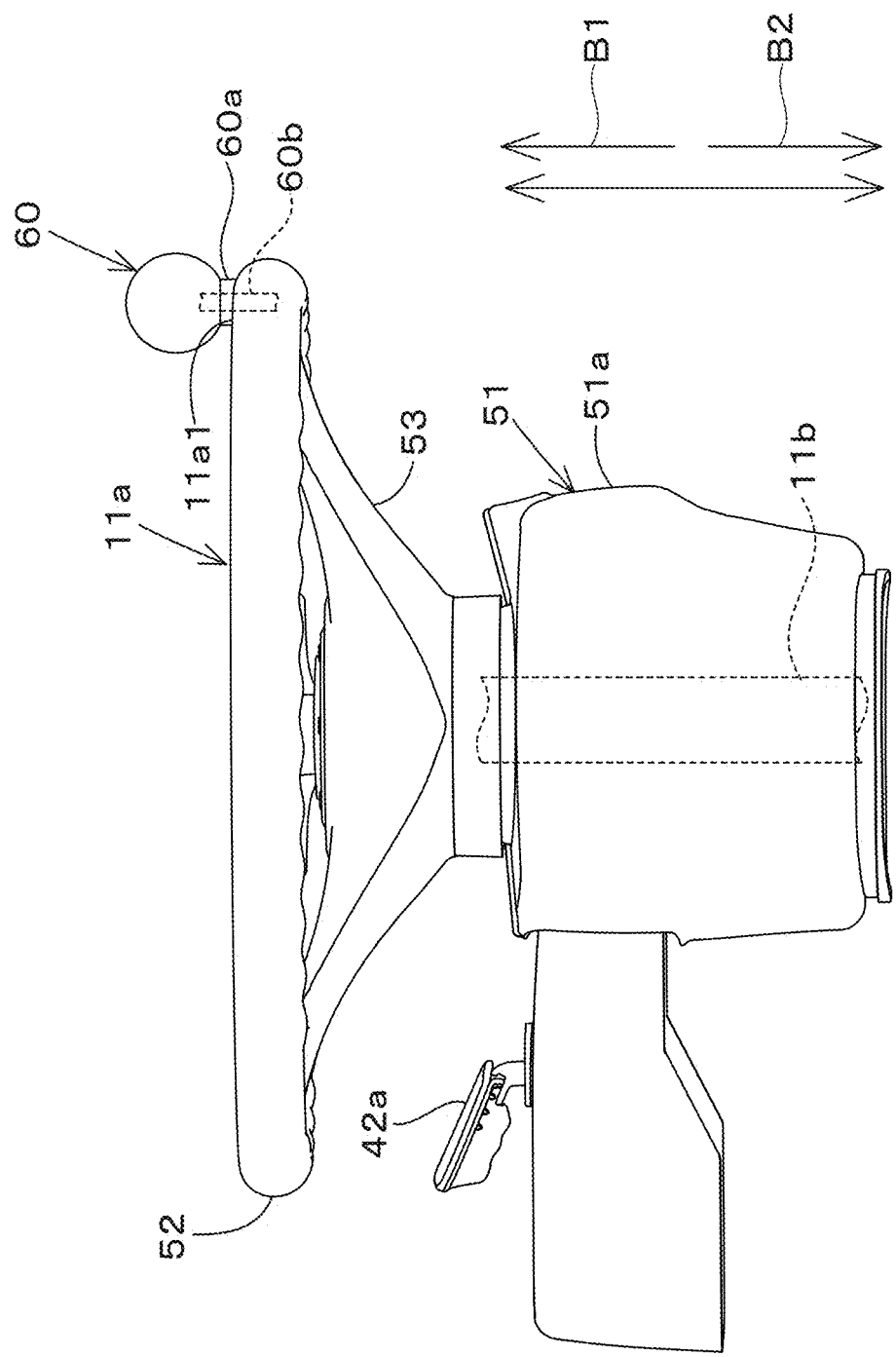

As shown in FIG. 12, a steering device 50 is provided at the front portion of the operator seat 10, and the steering device 50 includes a operation console 51. As shown in FIG. 4 to FIG. 6, the steering wheel 11a, shuttle lever 42a, and the like are supported on the steering table 51.

As shown in FIG. 4 and FIG. 5, the steering handle 11*a* includes a grip portion 52, which is grasped and steered by the driver, and a support portion 53, which supports the grip portion 52 on the rotation shaft 11*b*. In the case of the present preferred embodiment, the grip portion 52 preferably has a circular shape.

The shape of the grip portion 52 is not limited to a circular shape, but may also be a substantially D-shaped shape including a circular curved portion and a flat portion on a straight line connecting the ends of the curved portion, and the shape is not limited thereto.

As shown in FIG. 5 and FIG. 6, the support portion 53 is extended outward in diameter from the top end portion of the rotational shaft 11*b*, and the outer end is connected to the inner side of the grip portion 52. In this preferred embodiment, the support portion 53 is a spoke-shaped portion that is extended from the rotational shaft 11*b*, for example, with a plurality of spaced at roughly equal intervals.

As shown in FIG. 6, the rotation shaft 11*b* is connected to the bottom portion of the steering handle 11*a* and extends downward. The rotation shaft 11*b* extends from the front side B1 of the steering handle 11*a* to the rear side B2 of the steering handle 11*a*. The rotation shaft 11*b* is inserted and rotatably supported in a steering column 51*a* on the top of the steering table 51.

By operating (pivoting) the shuttle lever 42*a* forward or backward, the forward/backward switching portion 5*b*2 is switched, and the direction of travel (direction of travel) of the machine body 3 is switched to the forward or backward direction. The shuttle lever 42*a* is provided on the rear side B2 of the grip portion 52 of the steering handle 11*a*. The shuttle lever 42*a* can be switched to a forward, neutral, or backward position by pivoting forward or backward.

Figure 8A:
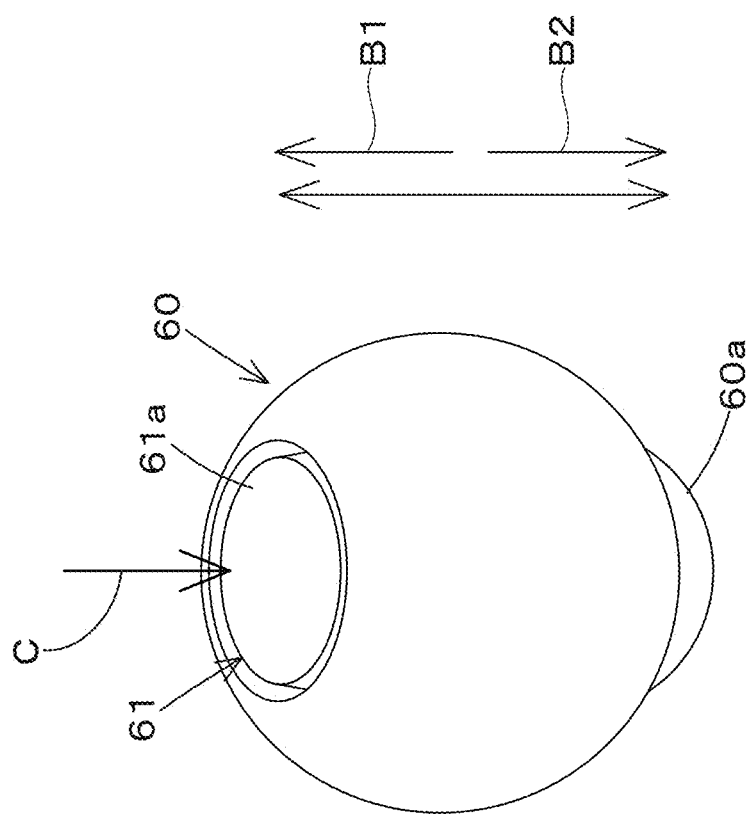
FIG. 8A is a perspective view illustrating an assist grip and an operation tool.

As shown in FIG. 7, FIGS. 8A and 8B, the working machine 1 is provided with an assist grip (spinner) 60 and an operation tool 61. The assist grip 60 is attached to the steering wheel 11*a* and assists in the rotation operation of the steering wheel 11*a*. The assist grip 60 is shaped, for example, in the shape of a sphere, a cylinder, or a spindle, and is easy for an operator (driver) to grasp.

In this preferred embodiment, the assist grip 60 is spherical, as shown in FIGS. 8A and 8B. The base portion 60*a* of the assist grip 60 is attached to the attachment portion 11*a*1 of the steering handle 11*a* and is projected on the front side B1 of the steering handle 11*a*.

In particular, the base portion 60*a* of the assist grip 60 is disposed at least away from the rotation shaft 11*b* of the support 53 and the grip portion 52 of the steering handle 11*a*. The assist grip 60 is attached to the grip portion 52 and is preferably located on the outer diameter end portion of the steering handle 11*a*.

The assist grip 60 is pivotally attached to the steering wheel 11*a*. As shown in FIG. 5 and FIG. 6, the assist grip 60 is pivotally mounted on a pivoting axis 60*b* extending from the front side B1 to the rear side B2.

The rear side B2 of the rotation shaft 60*b* is attached to the front side B1 of the grip portion 52, and the rotation shaft 60*b* connects the grip portion 52 with the assist grip 60. That is, the axis line of the pivoting axis 60*b* of the assist grip 60 is parallel or substantially parallel to the axis line of the rotation shaft 11*b*.

By operating the assist grip 60 around the rotation shaft 11*b*, the operator can easily operate the steering wheel 11*a* without grasping the steering wheel 11*a*. Thus, the further the distance between the axial centerline of the pivot shaft 60*b* and the axial centerline of the rotation shaft 11*b* is, the less force the operator can operate the steering wheel 11*a* with.

As shown in FIG. 7, FIGS. 8A and 8B, an operation tool 61 is provided on an assist grip 60 to operate the equipment provided on the machine body 3. The operation tool 61 is communicatively connected to the controller 40 in wireless or wired communication and is capable of outputting operation signals (signals) to the controller 40.

In this preferred embodiment, an example of the case in which the operation tool 61 is wired to the controller 40 will be described. When the operation tool 61 is wirelessly connected to the controller 40, the operation tool 61 is provided with a transmitter device that transmits a signal to the controller 40 and a battery that supplies power to the transmitter device.

As shown in FIG. 7, the operation tool 61 is switchable to a plurality of operating positions, and has, for example, a number of movable contacts 62 and 63, and fixed contacts 64, corresponding to the number of operating positions. In this preferred embodiment, it is a double action switch that can be switched to two operating positions.

As shown in FIG. 7, the operation tool 61 includes a first movable contact 62, a second movable contact 63, and a fixed contact 64.

The first movable contact 62 and the second movable contact 63 are relatively flexible and switchable between a non-operational state and an operational state. The first movable contact 62 is connected to a first cable 65*a*, which inputs a signal to the controller 40. A second cable 65*b* is connected to a second movable contact 63, which inputs a signal to an operation tool 61. A third cable 65*c* is connected to the fixed contacts 64, which sends a signal to the controller 40.

As shown in FIG. 7, the first movable contact 62 is disposed outside of the second movable contact 63 (opposite to the operating direction C of the operation tool 61), and the second movable contact 63 is disposed outside of the fixed contact 64. Thus, when the operation tool 61 is pressed in the operative direction C, the first movable contact 62 and the second movable contact 63 come into contact with each other (a half-pressing operation).

In this manner, the first cable 65*a* connected to the first movable contact 62 and the second cable 65*b* connected to the second movable contact 63 are energized, and the signal output to the operation tool 61 is input to the controller 40 via the second cable 65*b*, the second movable contact 63, the first movable contact 62, and the first cable 65*a*. The controller 40 is thus capable of obtaining operation information for the half-pressing operation of the operation tool 61 based on the signal input from the first cable 65*a*.

When the operation tool 61 is pressed farther in the operating direction C from the half-pressing operation, the first movable contact 62 presses the second movable contact 63 in the operating direction C, and the second movable contact 63 and the fixed contact 64 come into contact (push-off operation). This causes the second cable 65*b* connected to the second movable contact 63 and the third cable 65*c* connected to the fixed contact 64 to be energized, and the signal output to the operation tool 61 is input to the controller 40 via the second cable 65*b*, the second movable contact 63, the fixed contact 64, and the third cable 65*c*.

For this reason, the controller 40 is able to obtain operational information for the push-off operation of the operation tool 61 based on a signal input from the first cable 65*a* and a signal input from the third cable 65*c*.

That is, in this preferred embodiment, when no signal is input from the first cable 65a and the third cable 65c, the controller 40 detects that the operation tool 61 is not operated.

When a signal is input from the first cable 65a and no signal is input from the third cable 65c, the controller 40 detects that the operation tool 61 is being half-pressed, and when a signal is input from the first cable 65a and the third cable 65c, the controller 40 detects that the operation tool 61 is being pressed down.

In the above-described preferred embodiment, the operation tool 61 is described as an example of a double action switch that can be switched to two operating positions, but the operation tool 61 need only be switchable to multiple operating positions, and existing technology can be used as appropriate.

Describing the wiring connected to the operation tool 61, as shown in FIG. 7, the first through third cables 65a, 65b and 65c connected to the operation tool 61 are connected to a cable body 66 arranged inside or outside the steering handle 11a. The cable body 66 includes a plurality of cables and includes a cable connecting at least each of the first to third cables 65a, 65b and 65c to the controller 40 and the like.

In detail, the cable body 66 includes a fourth cable 66a connecting the first cable 65a to the controller 40, a fifth cable 66b connected to the second cable 65b, and a sixth cable 66c connecting the third cable 65c to the controller 40.

The fourth cable 66a transmits the signal input from the first cable 65a to the controller 40. The fifth cable 66b transmits the signal to the second cable 65b. The sixth cable 66c transmits the signal input from the third cable 65c to the controller 40.

As shown in FIG. 7, the first three cables 65a, 65b and 65c and the fourth to sixth cables 66a, 66b and 66c are connected by a connector structure 70 that can be rotated around the rotation shaft 60b, respectively.

As shown in FIG. 7, the connector structure 70 includes a plurality of brushes 71 and a plurality of non-endowed rings 72, each in contact with one of the plurality of brushes 71. The plurality of brushes 71 are conductors and are disposed on one side of the base portion 60a of the assist grip 60 and the attachment portion 11a1 of the steering handle 11a.

In this preferred embodiment, a plurality of brushes 71 are disposed at the base portion 60a of the assist grip 60. The plurality of brushes 71 correspond to the first to third cables 65a, 65b and 65c and include a first brush 71a connected to the first cable 65a, a second brush 71b connected to the second cable 65b, and a third brush 71c connected to the third cable 65c.

As shown in FIG. 7, the plurality of rings 72 are circular conductors and are disposed on the other side of the base portion 60a of the assist grip 60 and the attachment portion 11a1 of the steering wheel 11a. In this preferred embodiment, the plurality of rings 72 are disposed in the attachment portion 11a1 of the steering handle 11a.

The plurality of rings 72 correspond to the fourth to sixth cables 66a, 66b and 66c, and include a first ring 72a connected to the fourth cable 66a, a second ring 72b connected to the fifth cable 66b, and a third ring 72c connected to the sixth cable 66c.

The plurality of rings 72 are arranged in concentric circles with the axial center of the rotation shaft 60b and correspond to the plurality of brushes 71, respectively. In detail, the first ring 72a and the first brush 71a correspond to each other, and the first brush 71a can slide around the axis center of the rotation shaft 60b while maintaining an energized state with the first ring 72a.

The second ring 72b corresponds to the second brush 71b, and the second brush 71b is slidable around the axis of the rotation shaft 60b while maintaining an energized state with the second ring 72b. The third ring 72c corresponds to the third brush 71c, and the third brush 71c is slidable around the axis of the rotational shaft 60b while maintaining an energized state with the third ring 72c.

The connector structure 70 need only connect the first to third cables 65a, 65b and 65c and the fourth to sixth cables 66a, 66b and 66c, respectively, pivotally around the pivoting axis 60b, and the configuration is not limited to the above configuration and existing technology can be used as appropriate.

To explain the position of the operation tool 61 in the assist grip 60, as shown in FIGS. 8A and 8B, the operation tool 61 is disposed on the opposite side of the base portion 60a of the assist grip 60, which is attached to the steering wheel 11a. That is, the operation tool 61 is disposed on the front side B1 of the assist grip 60 so that the operating direction C is oriented from the front side B1 to the rear side B2.

Thus, with the operation tool 61 located on the front side B1, the operator can easily grasp the position of the operation tool 61 and improve the operability of the operation tool 61. The operation tool 61 is arranged such that the operation surface 61a is located inside (rear side B2) of the outer surface (front side B1) of the assist grip 60.

In other words, the operation surface 61a is recessed more inwardly than the outer surface of the assist grip 60. This deters mishandling of the operation tool 61.

Figure 9A:
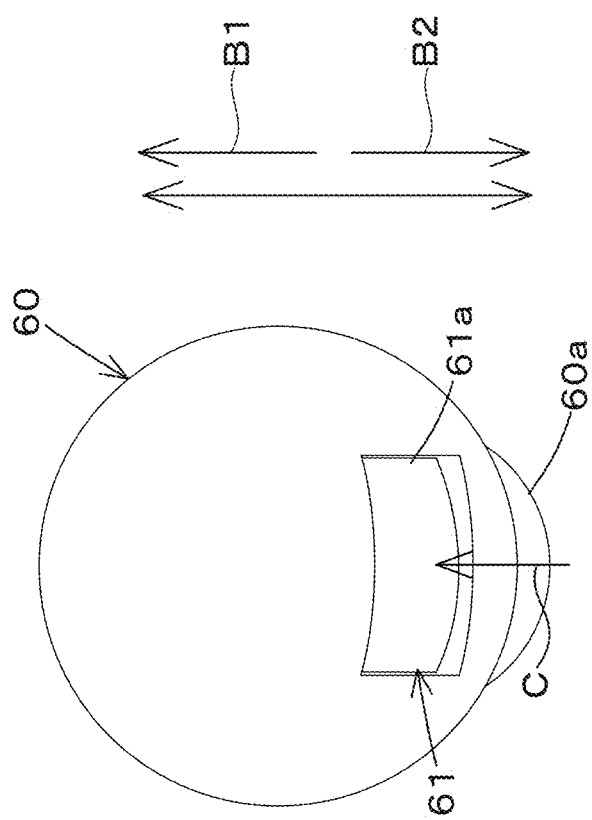
FIG. 9A is a perspective view illustrating an assist grip and an operation tool according to a first modified example of a preferred embodiment of the present invention.

The position of the operation tool 61 is not limited to the opposite side of the base portion 60a, and the operation tool 61 may be located on the base portion 60a side of the assist grip 60, as shown in FIGS. 9A and 9B.

In this case, the operation tool 61 is disposed on the back side B2 of the assist grip 60, and the operation tool 61 is disposed so that the operating direction C faces the front side B1 rather than the back side B2. This allows the operator to operate the operation tool 61 with a finger grasping the assist grip 60 from the front side B1.

Furthermore, because the operation tool 61 is located between the steering wheel 11a and the assist grip 60, it can be prevented from coming into contact with other members or workers. The operation tool 61 is arranged such that the operation surface 61a is located inward (front side B1) from the outer surface (rear side B2) of the assist grip 60.

Figure 10A:
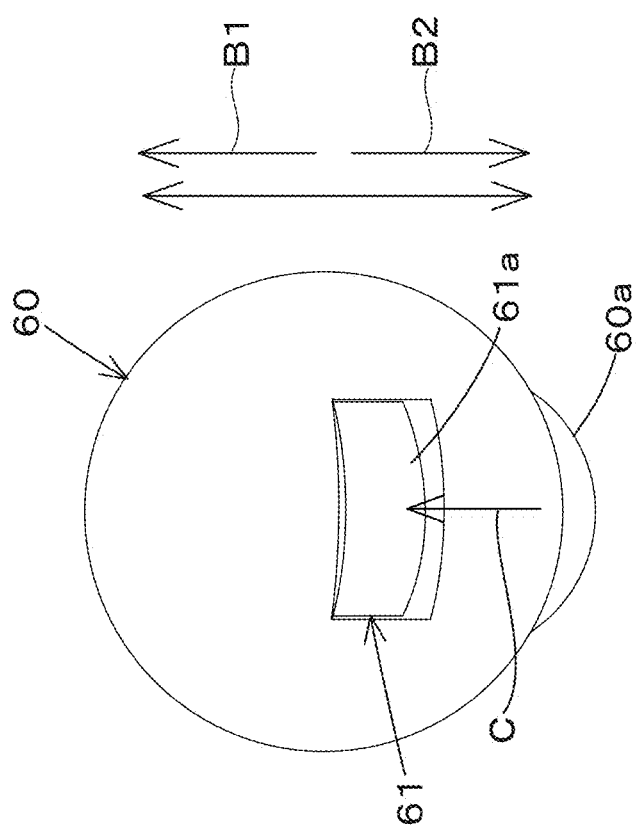
FIG. 10A is a perspective view illustrating an assist grip and an operation tool according to a second modified example of a preferred embodiment of the present invention.

As shown in FIGS. 10A and 10B, the operation tool 61 may be disposed between the base portion 60a and the opposite side of the base portion 60a of the assist grip 60.

In this case, the operation tool 61 is disposed on the side between the front side B1 and the rear side B2 of the assist grip 60, and the operation tool 61 is disposed such that the operating direction C faces the approaching direction of the axial line of the rotation shaft 60b. In this preferred embodiment, the operation tool 61 is disposed at the position where the outer diameter of the assist grip 60 is largest in a straight line direction facing the front side B1 and the rear side B2.

This allows the operator to easily operate the operation tool 61 with a finger grasping the assist grip 60. The operation tool 61 is arranged such that the operation surface 61a is located inside the outer surface of the assist grip 60.

Figure 11A:
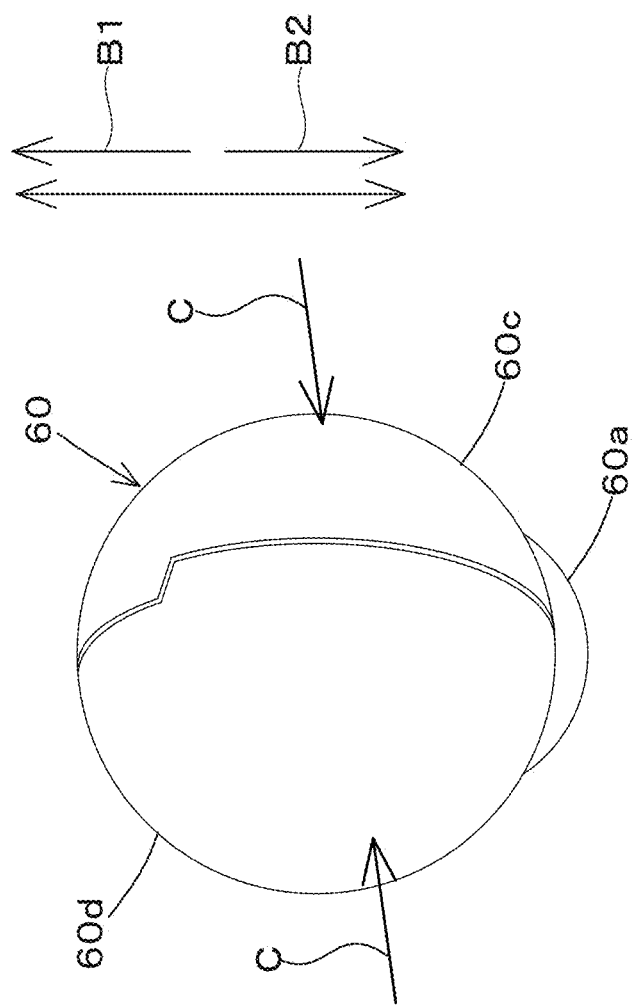
FIG. 11A is a perspective view illustrating an assist grip and an operation tool according to a third modified example of a preferred embodiment of the present invention.
Figure 11B:
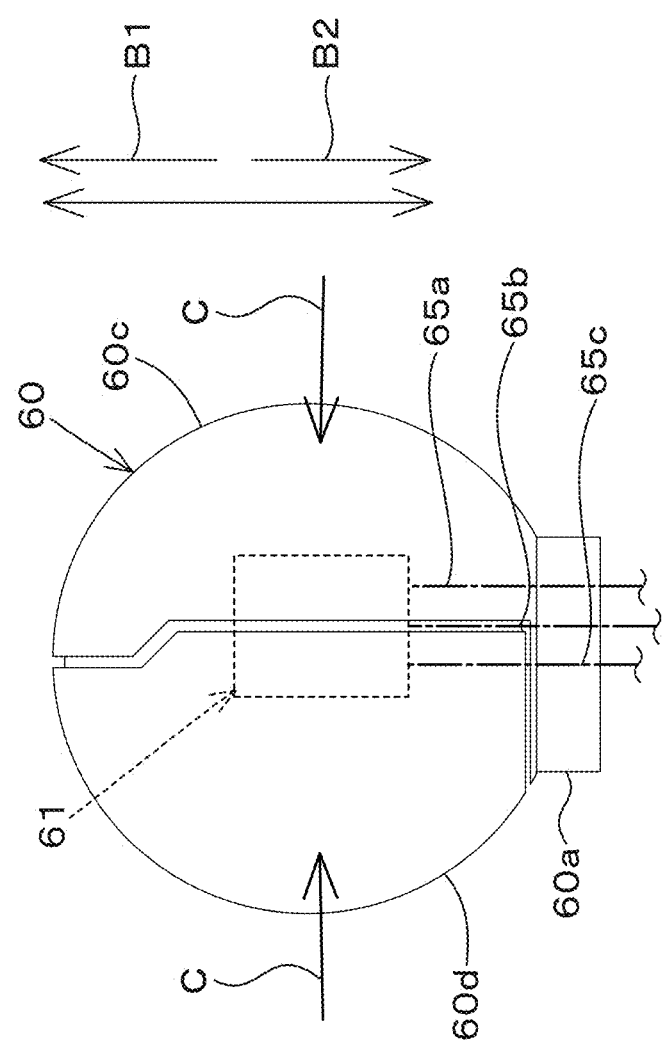
FIG. 11B is a side view illustrating an assist grip and an operation tool according to a third modified example of a preferred embodiment of the present invention.

Furthermore, as shown in FIGS. 11A and 11B, the operation tool 61 is disposed inside the assist grip 60 and may be configured to detect the gripping operation of the assist grip 60 by the operator.

In this case, the assist grip 60 consists of a plurality of structures and is divided into the operating direction C of the grip operation. For example, the assist grip 60 includes an substantially hemispherical base portion 60c and an operation portion 60d defined by dividing the sphere into a planar direction facing the front side B1 and the rear side B2.

The base portion 60c includes the base portion 60a and is the portion attached to the attachment portion 11a1 of the steering handle 11a. The operation tool 61 is disposed between the base portion 60c and the actuator 60d, and the operating direction C is oriented in the direction of approach between the base portion 60c and the operating portion 60d.

Thus, when the operator grasps the assist grip 60, the base portion 60c and the operating portion 60d come close to each other, and the operation tool 61 is pressed and operated. This allows the operator to easily operate the operation tool 61 while grasping the assist grip 60.

The operation tool 61 inputs an operating signal (signal) to the controller 40, and the controller 40 controls the equipment provided in the machine body 3 based on the signal. This allows the operation tool 61 to operate the equipment provided in the machine body 3. The equipment provided in the machine body 3 includes, for example, the speed-shifter device 5, the prime mover 4, the steering mechanism 11, the lifter device 8, the controller 40, the position detector 43, and so on, and any equipment that can be operated by the operation signal of the operation tool 61 can be operated.

For example, the controller 40 controls the forward and backward movement of the machine body 3 based on the operation of the shuttle lever 42a plus or instead of the operation of the operation tool 61. In such a case, the speed-shifter device 5 switches the machine body 3 forward and backward based on the operation of the operation tool 61.

When the operation tool 61 is pushed off, that is, when the operation tool 61 is switched to two or more of the multiple operating positions, the controller 40 activates the forward/backward switching portion 5b2 of the shuttle portion 5b to switch from forward to backward or switch backward to forward.

In particular, the controller 40 switches from forward to backward or switches from backward to forward by controlling the first control valve 17a and the second control valve 17b to switch the engagement and disengagement states of the forward clutch portion 35 and the engagement and disengagement states of the backward clutch portion 36, based on the operation of the operation tool 61.

In addition to or instead of the operation of the speed-shifting switch 42d, the controller 40 may control the transmission step of the speed-shifter device 5 based on the operation of the operation tool 61. In such a case, the speed-shifter device 5 switches between two-wheel drive and four-wheel drive based on the operation of the operation tool 61.

When the operation tool 61 is pushed off, that is, when the operation tool 61 is switched to two or more of the multiple operating positions, the speed-shifter device 5 switches the machine body 3 from two-wheel drive to four-wheel drive or from four-wheel drive to two-wheel drive.

In particular, the controller 40 switches the machine body 3 from two-wheel drive to four-wheel drive or from four-wheel drive to two-wheel drive by changing the opening degree of the fourth control valve 17d to switch the connection state of the first front speed-shifting clutch 5f1 to a disconnected state, and changing the opening degree of the fifth control valve 17e to switch the connection state of the second front speed-shifting clutch 5f2 to a disconnected state, based on the operation of the operation tool 61.

In addition to or instead of the operation of the speed-shifting switch 42d, the controller 40 may control the transmission step of the speed-shifter device 5 based on the operation of the operation tool 61. In such a case, when the operation tool 61 is pushed off, that is, when the operation tool 61 is switched to two or more of a plurality of operating positions, the controller 40 switches the speed-shifter device 5 from the automatic shifting to the manual shifting, or from the manual shifting to the automatic shifting.

For example, when the controller 40 switches the speed-shifter device 5 from the automatic shifting to the manual shifting in response to a push-off operation of the operation tool 61, the controller 40 automatically switches one of the main speed-shifter portion 5c and the sub speed-shifter portion 5d according to the shifting step (shifting level) set by the transmission lever 42e, and changes the shifting step of the speed-shifter device 5.

On the other hand, when the controller 40 switches the speed-shifter device 5 from the manual shifting to the automatic shifting in response to the push-off operation of the operation tool 61, the controller 40 automatically switches one of the main speed-shifter device 5c and the secondary speed-shifter device 5d according to the state of the working machine 1, and automatically changes the gear shifting step (gear shift level) of the speed-shifter device 5 to a predetermined gear shifting step (gear shift level).

The speed-shifter device 5 need only change the propulsion force based on the operation of the operation tool 61, and the configuration may be such that the speed-shifter device 5 changes the shifting step based on the operation of the operation tool 61.

The controller 40 may also perform the braking control of the brake device 25 based on the operation of the operation tool 61. In such a case, the brake device 25 performs braking based on the operation of the operation tool 61. When the operation tool 61 is pushed off, that is, when the operation tool 61 is switched to two or more operating positions out of the plurality of operating positions, the controller 40 switches the brake device 25 from the braking state to the braking release state without braking, or from the braking release state to the braking state.

In particular, when the controller 40 switches the brake device 25 from the braking state to the braking release state based on the operation of the operation tool 61, the controller 40 changes the opening degree of the sixth control valve 17f and the opening degree of the seventh control valve 17g to move the left connector member 26a and the right connector member 26b to the opposite side of the braking direction to switch the brake device 25 to the braking release state.

When the controller 40 switches the brake device 25 from the braking release state to the braking state based on the operation of the operation tool 61, the controller 40 changes the opening degree of the sixth control valve 17f and the opening degree of the seventh control valve 17g to move the left connector member 26a and the right connector member 26b in the braking direction to switch the brake device 25 to the braking state.

The controller 40 may also control the number of revolutions of the prime mover 4 based on the operation of the operation tool 61. In such a case, the prime mover 4 changes the number of revolutions based on the operation of the operation tool 61. For example, when the operation tool 61 is pushed down, that is, when the operation tool 61 is switched to two or more of a plurality of operating positions, the mode for controlling the number of revolutions of the prime mover 4 is switched. The mode includes, for example, a first mode and a second mode for control different from the control of the first mode.

In the first mode, the controller 40 controls the number of revolutions of the prime mover 4 to a number of revolutions depending on the amount of operation of the gas pedal 42ƒ; in the second mode, the controller 40 controls the number of revolutions of the prime mover 4 to a number of revolutions depending on the amount of operation of the gas pedal 42ƒ plus a predetermined number of revolutions.

The prime mover 4 may be configured such that the number of revolutions may be changed based on the operation of the operation tool 61, and the method of control is not limited to the above method.

The controller 40 may also change the steering angle of the steering mechanism 11 based on the operation of the operation tool 61. In such a case, the steering mechanism 11 changes the steering angle of the machine body 3 in response to a rotation operation of the steering handle 11a based on the operation of the operation tool 61.

For example, when the operation tool 61 is pushed down, that is, when the operation tool 61 is switched to two or more of a plurality of operating positions, the controller 40 switches a mode to control the steering angle of the steering mechanism 11. The mode includes, for example, a third mode and a fourth mode of control that is different from the third mode.

The fourth mode is a mode in which the ratio of the steering angle of the steering mechanism 11 corresponding to the amount of operation of the steering wheel 11a is higher than in the third mode. In switching between the third and fourth modes, the controller 40 controls the assist mechanism 11c to change the ratio of the steering angle of the steering mechanism 11 corresponding to the amount of operation of the steering handle 11a.

The steering mechanism 11 may be configured such that the steering angle can be changed to any steering angle based on the operation of the operation tool 61, and the method of control is not limited to the above method.

The controller 40 may control the lifting and lowering of the lifter device 8 based on the operation of the operation tool 61 in addition to or instead of the operation of the pump switch 42g. In such a case, the lifter device 8 lifts and lowers the working machine based on the operation of the operation tool 61.

For example, when the operation tool 61 is pushed off, that is, the operation tool 61 is switched to two or more of a plurality of operating positions, and the operation is a short-pressing operation (an operation with at least a shorter operating time than the long-pressing operation described below), the controller 40 switches between a lifting mode, in which the lifter device 8 is operated up, and a lowering mode, in which the lifter device 8 is operated down.

In the lowering mode, when the operation tool 61 is pushed down and long-pressing (at least the operation time is longer than the short-pressed operation), the controller 40 extends the lift cylinder 8e by controlling the eighth control valve 17h to lift the rear end portion of the lift arm 8a (the end portion of the working device side).

On the other hand, in the lowering mode, when the operation tool 61 is pushed and held down for a long time, the eighth control valve 17h is controlled to shorten the lift cylinder 8e to lower the rear end portion of the lift arm 8a (the end portion of the working device side).

The lifter device 8 need only lift and lower the working machine based on the operation of the operation tool 61, and the control method may be such that when the assist grip 60 is provided with two operation tools 61, the lifter device 8 is operated upward when one of the operation tools 61 is pressed through, and the lifter device 8 is operated downward when the other operation tool 61 is pressed through, and the control method is not limited to the above method.

In the present preferred embodiment, the operation tool 61 is connected to the controller 40 to operate the equipment, but the operation tool 61 need only be able to operate the equipment provided on the machine body 3, and the operation tool 61 may be connected to the equipment in communication with the equipment by wireless or wired communication, and may be configured to operate the equipment directly by inputting a signal to the equipment.

The equipment to be operated by the operation tool 61 is not limited to the equipment described above, and the operation tool 61 may be operated in place of or in addition to the ignition switch 42b, the PTO speed-shifter lever 42c, and the gas pedal 42ƒ, and the like, and the equipment provided in the working machine 1.

In this preferred embodiment, although a single operation tool 61 is provided in the assist grip 60, the assist grip 60 may be provided with a plurality of operation tools 61. In such a case, each of the operation tools 61 operates the same or a different device.

The aforementioned working machine 1 is provided with the traveling machine body 3, the working device mounted on the machine body 3, the rotatable steering handle 11a provided on the machine body 3, the assist grip 60 attached to the steering handle 11a and assisting in the rotational operation of the steering handle 11a, and the operation tool 61 provided on the assist grip 60 and operating equipment provided on the machine body 3.

According to the above configuration, the operator can operate the equipment while operating the steering handle 11a with the assist grip 60. Thus, the operability of the working machine 1 is improved.

The operation tool 61 is disposed on the opposite side of the base portion 60a of the assist grip 60 that is attached to the steering handle 11a. According to the above configuration, disposing the operation tool 61 on the opposite side of the base portion 60a allows the operator to easily grasp the position of the operation tool 61.

The operation tool 61 is disposed on the side of the base portion 60a of the assist grip 60 that is attached to the steering handle 11a. According to the above configuration, the operation tool 61 is located between the steering handle 11a and the assist grip 60, which prevents the operation tool 61 from coming into contact with other members or workers.

The operation tool 61 is disposed between the base portion 60a of the assist grip 60, which is attached to the steering handle 11a, and the opposite side of the base portion 60a. According to the above configuration, when the assist grip 60 is grasped, the operator can easily operate the operation tool 61 with a finger grasping the assist grip 60.

The steering handle 11a has a grip portion 52 for steering and a support portion 53 to support the grip portion 52 on a rotation shaft 11b, and an assist grip 60 is attached to the grip portion 52. According to the above configuration, the assist grip 60 can be operated to rotate the grip portion 52, and the steering wheel 11a can be easily operated.

The assist grip 60 is pivotable. According to the above configuration, the operator can smoothly operate the steering wheel 11a using the assist grip 60.

The operation tool 61 is switchable to a plurality of operating positions, and the equipment is activated when the operation tool 61 is switched to two operating positions or more. According to the above configuration, the equipment does not operate when the operating position is less than two, thus preventing the equipment from being accidentally activated by a mis-operation of the operation tool 61.

The equipment also includes the speed-shifter device 5 capable of switching the machine body 3 between the forward traveling and the backward traveling, and the speed-shifter device 5 switches the machine body 3 between the forward traveling and the backward traveling based on the operation of the operation tool 61. According to the above configuration, the forward and backward traveling of the machine body 3 is allowed while operating the steering handle 11a by operating the assist grip 60. This facilitates the turning back operation of the machine body 3 and other operations.

The machine body 3 includes the front wheel 7F and the rear wheel 7R, and the equipment includes the speed-shifter device 5 that can be switched between the two-wheel driving, which drives one of the front wheel 7F and the rear wheel 7R, and the four-wheel driving, which drives both the front wheel 7F and the rear wheel 7R, and the speed-shifter device 5 switches between the two-wheel driving and the four-wheel driving based on the operation of the operation tool 61.

According to the above configuration, it is possible to switch between the two-wheel driving and the four-wheel driving while operating the steering handle 11a by operating the assist grip 60. Thus, the operability of the working machine 1 is improved.

The equipment also includes the speed-shifter device 5 capable of changing the propulsion force of the machine body 3, and the speed-shifter device 5 changes the propulsion force based on the operation of the operation tool 61. According to the above configuration, the traveling speed of the machine body 3 can be easily changed at the same time as the turning operation.

The equipment also includes the brake device 25 that performs braking of the machine body 3, and the brake device 25 performs braking based on operation of the operation tool 61. According to the above configuration, braking of the machine body 3 can be easily performed at the same time as the turning operation of the machine body 3, thus making the working machine 1 more agile to operate.

The equipment also includes the prime mover 4 that outputs power, and the prime mover 4 changes the number of revolutions based on the operation of the operation tool 61. According to the above configuration, the speed can be easily changed when the speed of the prime mover 4 is low while steering the machine body 3.

The equipment also includes the steering mechanism 11 that steers the machine body 3 in response to a rotation operation of the steering handle 11a, and the steering mechanism 11 changes the steering angle of the machine body 3 in response to a rotation operation of the steering handle 11a based on an operation of an operation tool 61. According to the above configuration, it is possible to adjust the steering angle while steering the machine body 3. Thus, the steering angle can be fine-tuned during the turning movement of the machine body 3 and the working machine 1 can be easily steered.

The equipment also includes the lifter device 8 that connects the working machine to the machine body 3 in a way that allows it to be lifted and lowered, and the lifter device 8 lifts and lowers the working machine based on the operation of the operation tool 61. According to the above configuration, the lifting and lowering of the lifter device 8 can be easily performed while steering the machine body 3. As a result, the working machine 1 can be lifted when the machine body 3 is turned, and the working machine 1 can be easily lowered as the machine body 3 is shifted from the turning movement to the straight traveling.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
    a machine body capable of traveling;
    a working device configured to be detachably attached to the machine body;
    a steering handle provided to the machine body and capable of being rotatably operated;
    an assist grip attached to the steering handle to assist a rotating operation of the steering handle;
    an operation tool provided to the assist grip and configured to operate at least one device provided to the machine body; and
    a controller configured or programmed to control the at least one device based on no signal, a first signal, and a second signal output from the operation tool; wherein
    the steering handle includes a grip to steer the machine body and a support to rotatably support the grip about a rotation axis of the steering handle;
    the assist grip is rotatably attached to the grip;
    the operation tool includes a flexible first movable contact, a flexible second movable contact, and a fixed contact; and
    the operation tool is configured to:
        output no signal to the controller when the operation tool is not pressed;
        output the first signal to the controller when the operation tool is pressed to such an extent that the first movable contact contacts the second movable contact; and
        output the second signal to the controller when the operation tool is further pressed to such an extent that the second movable contact contacts the fixed contact.

2. The working machine according to claim 1, wherein the operation tool is located on a side opposite to a base portion of the assist grip attached to the steering handle.

3. The working machine according to claim 1, wherein the operation tool is located on a side of a base portion of the assist grip attached to the steering handle.

4. The working machine according to claim 1, wherein the operation tool is between a base portion of the assist grip and a side opposite to the base portion, the base portion being attached to the steering handle.

5. The working machine according to claim 1, wherein
    the at least one device includes a speed shifter to switch a driving direction of the machine body between forward traveling and rearward traveling; and
    the speed shifter switches the driving direction of the machine body between the forward traveling and the rearward traveling based on the first signal and the second signal output from the operation tool.

6. The working machine according to claim 1, wherein the machine body includes a front wheel and a rear wheel;
the at least one device includes a speed shifter to switch a driving of the machine body between two-wheel driving to drive one of the front wheel and the rear wheel and four-wheel driving to drive both of the front wheel and the rear wheel; and
the speed shifter switches the driving of the machine body between the two-wheel drive and the four-wheel driving based on the first signal and the second signal output from the operation tool.

7. The working machine according to claim 1, wherein the at least one device includes a speed shifter to change a propulsive power of the machine body; and
the speed shifter changes the propulsive power based on the first signal and the second signal output from the operation tool.

8. The working machine according to claim 1, wherein the at least one device includes a prime mover to output power; and
the prime mover changes a revolving speed based on the first signal and the second signal output from the operation tool.

9. The working machine according to claim 1, wherein the at least one device includes a steering mechanism, which includes the steering handle, to steer the machine body in accordance with the rotating operation of the steering handle; and
the steering mechanism changes a relative ratio of a steering angle of the machine body to the rotating operation of the steering handle, based on the first signal and the second signal output from the operation tool.

10. The working machine according to claim 1, wherein the at least one device includes a lifter to connect the working device to the machine body to lift the working device; and
the lifter lifts the working device based on the first signal and the second signal output from the operation tool.

11. The working machine according to claim 1, wherein the operation tool is configured to:
connect the first movable contact to the controller through a first cable having a first brush which is slidable on a first ring while being in contact with the first ring, and a fourth cable connected between the first ring and the controller;
connect the second movable contact to the controller through a second cable having a second brush which is slidable on a second ring while being in contact with the second ring, and a fifth cable connected between the second ring and the controller; and
connect the third movable contact to the controller through a third cable having a third brush which is slidable on a third ring while being in contact with the third ring, and a sixth cable connected between the third ring and the controller.

12. The working machine according to claim 11, wherein the operation tool is configured to:
output the first signal to the controller through the fourth cable, the first ring, the first brush, the first cable, the first movable contact, the second movable contact, the second cable, the second brush, the second ring, and the fifth cable; and
output the second signal to the controller through the fifth cable, the second ring, the second brush, the second cable, the second movable contact, the fixed contact, the third cable, the third brush, the third ring, and the sixth cable.

* * * * *